(12) United States Patent
Prasad et al.

(10) Patent No.: US 12,032,546 B2
(45) Date of Patent: Jul. 9, 2024

(54) SYSTEMS AND METHODS FOR POPULATING A STRUCTURED DATABASE BASED ON AN IMAGE REPRESENTATION OF A DATA TABLE

(71) Applicant: nference, inc., Cambridge, MA (US)

(72) Inventors: Ashim Prasad, Bangalore (IN); Melwin Babu, Thrissur (IN); Dibakar Saha, Jalpaiguri (IN)

(73) Assignee: nference, Inc., Cambridge, MA (US)

( * ) Notice: Subject to any disclaimer, the term of this patent is extended or adjusted under 35 U.S.C. 154(b) by 375 days.

(21) Appl. No.: 16/931,074

(22) Filed: Jul. 16, 2020

(65) Prior Publication Data

US 2021/0019287 A1    Jan. 21, 2021

Related U.S. Application Data

(60) Provisional application No. 62/874,830, filed on Jul. 16, 2019.

(51) Int. Cl.
*G06F 16/22* (2019.01)
*G06F 16/21* (2019.01)
(Continued)

(52) U.S. Cl.
CPC ............ *G06F 16/221* (2019.01); *G06F 16/21* (2019.01); *G06F 16/2282* (2019.01);
(Continued)

(58) Field of Classification Search
CPC ...... G06F 16/21; G06F 16/221; G06F 16/287; G06F 16/2282; G06K 9/6256; G06N 3/08; G06N 3/10; G06V 10/56; G06V 10/225

See application file for complete search history.

(56) References Cited

U.S. PATENT DOCUMENTS 7,464,043 B1 * 12/2008 Dussia ................... G16H 40/63
600/300
8,601,361 B2 * 12/2013 Berger .................. G06F 16/258
715/224

(Continued)

FOREIGN PATENT DOCUMENTS

CN         101976170 A   *  2/2011   ............. G06F 3/048
JP         2019-536178 A    12/2019
WO        WO-2018057945      3/2018

OTHER PUBLICATIONS

AMD Secure Encrypted Virtualization (SEV), https://developer.amd.com/sev/, accessed Sep. 23, 2020 (5 pages).

(Continued)

*Primary Examiner* — Irete F Ehichioya
*Assistant Examiner* — Ken Hoang
(74) *Attorney, Agent, or Firm* — Caldwell Intellectual Property Law

(57) ABSTRACT

Systems and methods for populating a structure database including accessing an image representation of a data table comprising one or more cells arranged in rows and columns; providing the image representation as an input to a neural network model; executing the neural network model to identify a location of the first content object in the image representation; identifying a location of the first cell based on the location of the first content object; determining that the first cell belongs to the first row and the first column based on the location of the first cell and the first content object in relation to a plurality of content objects; associating the first content object with one or more categorical identifiers; and populating a structured database with the first content object and the one or more categorical identifiers.

25 Claims, 21 Drawing Sheets

(51) Int. Cl.
*G06F 16/28* (2019.01)
*G06F 18/214* (2023.01)
*G06N 3/08* (2023.01)
*G06V 10/22* (2022.01)
*G06V 10/82* (2022.01)
*G06V 30/19* (2022.01)
*G06V 30/412* (2022.01)

(52) U.S. Cl.
CPC .......... *G06F 16/287* (2019.01); *G06F 18/214* (2023.01); *G06N 3/08* (2013.01); *G06V 10/235* (2022.01); *G06V 10/82* (2022.01); *G06V 30/19173* (2022.01); *G06V 30/412* (2022.01)

(56) References Cited

U.S. PATENT DOCUMENTS

| | | | |
|---|---|---|---|
| 9,514,405 | B2 | 12/2016 | Chen et al. |
| 9,734,181 | B2 * | 8/2017 | Wang .................... G06F 16/211 |
| 10,360,507 | B2 | 7/2019 | Aravamudan et al. |
| 2004/0013302 | A1 | 1/2004 | Ma et al. |
| 2008/0243825 | A1 | 10/2008 | Staddon et al. |
| 2009/0116736 | A1 | 5/2009 | Neogi et al. |
| 2011/0255788 | A1 | 10/2011 | Duggan et al. |
| 2012/0323590 | A1 * | 12/2012 | Udani .................. G06Q 10/103 348/40 |
| 2013/0132331 | A1 | 5/2013 | Kowalczyk et al. |
| 2015/0254555 | A1 | 9/2015 | Williams, Jr. et al. |
| 2019/0354883 | A1 | 11/2019 | Aravamudan et al. |

OTHER PUBLICATIONS

Arora, S. et al., "A Simple but Tough-to-Beat Baseline for Sentence Embeddings", ICLR, 2017 (16 pages).
AWS Key Management Service (KMS), https://aws.amazon.com/kms, accessed Sep. 23, 2020 (6 pages).
Bartunov, S. et al., "Breaking Sticks and Ambiguities With Adaptive Skip-Gram", retrieved online from URL:< https://arxiv.org/pdf/1502.07257.pdf>,[cs.CL], Nov. 15, 2015 (15 pages).
Bojanowski, P. et al., "Enriching Word Vectors with Subword Information", retrieved online from URL:<https://arxiv.org/pdf/1607.04606.pdf>, [cs.CL], Jun. 19, 2017 (12 pages).
Confidential Computing Consortium, "What is the Confidential Computing Consortium?", https://confidentialcomputing.io, accessed Sep. 24, 2020 (2 pages).
De Guzman, C.G. et al., "Hematopoietic Stem Cell Expansion and Distinct Myeloid Developmental Abnormalities in a Murine Model of the AML1-ETO Translocation", Molecular and Cellular Biology, 22(15):5506-5517, Aug. 2002 (12 pages).
Desagulier, G., "A lesson from associative learning: asymmetry and productivity in multiple- slot constructions", Corpus Linguisitic and Linguistic Theory, 12(2):173-219, 2016, submitted Aug. 13, 2015, <http://www.degruyter.com/view/j/cllt.2016.12.issue-2/cllt-2015-0012/cllt-2015- 0012.XML?format=INT>. <10.1515/cllt-2015-0012>. <halshs-01184230>, (32 pages).
Devlin, J. et al., "BERT: Pre-training of Deep Bidirectional Transformers for Language Understanding", arXiv:1810.04805v2 [cs.CL], May 24, 2019 (16 pages).
Divatia, A., "The Fact and Fiction of Homomorphic Encryption", Dark Reading, www.darkreading.com/attacks-breaches/the-fact-and-fiction-of-homomorphic-encryption/a/d- id/1333691, Jan. 22, 2019 (3 pages).
Dwork, C., "Differential Privacy: A Survey of Results", Lecture Notes in Computer Science, m. Agrawal, et al., Eds., vol. 4978, pp. 1-19, 2008 (19 pages).
Genkin, D. et al., "Privacy in Decentralized Cryptocurrencies", Communications of the ACM, 61(6):78-88, Jun. 2018 (11 pages).
Hageman, G.S. et al., "A common haplotype in the complement regulatory gene factor H (HF1 / CFH) predisposes individuals to age-related macular degeneration", PNAS, 102(20):7227-7232, May 17, 2005 (6 pages).
Ikeda, T. et al., "Anticorresponding mutations of the KRAS and PTEN genes in human endometrial cancer", Oncology Reports, 7: 567-570, published online May 1, 2000 (4 pages).
Intel, "What is Intel® SGX?", http://www.intel.com/content/www/us/en/architecture-and-technology/software-guard-extensions.html, accessed Sep. 23, 2020 (8 pages).
International Search Report and Written Opinion issued by the European Patent Office as International Searching Authority in International Application PCT/US2017/053039, dated Dec. 20, 2017 (15 pages).
Joulin, A. et al., "Bag of Tricks for Efficient Text Classification", retrieved online from URL:<https://arXiv.org/pdf/1607.01759v3.pdf>, [cs.CL], Aug. 9, 2016 (5 pages).
Kiros, R. et al., "Skip-Thought Vectors", retrieved online from URL:<https://arXiv.org/abs/1506.06726v.1>, [cs.CL], Jun. 22, 2015 (11 pages).
Kolte, P. "Why Is Homomorphic Encryption Not Ready For Primetime?", Baffle, https://baffle.io/blog/why-is-homomorphic-encryption-not-ready-for-primetime/, Mar. 17, 2017 (4 pages).
Korger, C., "Clustering of Distributed Word Representations and its Applicability for Enterprise Search", Doctoral Thesis, Dresden University of Technology, Faculty of Computer Science, Institute of Software and Multimedia Technology, Matriculation Nr. 3703541, submitted Jul. 28, 2016 (116 pages).
Kutuzov, A. et al., "Cross-lingual Trends Detection for Named Entities in News Texts with Dynamic Neural Embedding Models", Proceedings of the NewsIR'16 Workshop at ECIR, Padua, Italy, Mar. 20, 2016 (6 pages).
Le, Q. et al., "Distributed Representations of Sentences and Documents", Proceedings of the 31st International Conference of Machine Learning, Beijing, China, vol. 32, 2014 (9 pages).
Li, H. et al., "Cheaper and Better: Selecting Good Workers for Crowdsourcing," retrieved online from URL: https://arXiv.org/abs/1502.00725v.1, pp. 1-16, Feb. 3, 2015 (16 pages).
Ling, W. et al., "Two/Too Simple Adaptations of Word2Vec for Syntax Problems", retrieved online from URL:<https://cs.cmu.edu/~lingwang/papers/naacl2015.pdf>, 2015 (6 pages).
Maxwell, K.N. et al., "Adenoviral-mediated expression of Pcsk9 in mice results in a low-density lipoprotein receptor knockout phenotype", PNAS, 101(18):7100-7105, May 4, 2004 (6 pages).
Mikolov, T. et al., "Distributed Representations for Words and Phrases and their Compositionality", retrieved online from URL:https://arXiv.org/abs/1310.4546.v1 [cs.CL], Oct. 16, 2013 (9 pages).
Mikolov, T. et al., "Efficient Estimation of Word Representations in Vector Space", retrieved online from URL: https://arXiv.org/abs/1301.3781v3 [cs.CL] Sep. 7, 2013 (12 pages).
Murray, K., "A Semantic Scan Statistic for Novel Disease Outbreak Detection", Master's Thesis, Carnegie Mellon University, Aug. 16, 2013 (68 pages).
Neelakantan, A., et al., "Efficient Non-parametric Estimation of Multiple Embeddings per Word in Vector Space," Department of Computer Science, University of Massachusetts, https://1library.net/document/zlg3o2oy-efficient-parametric-estimation-multiple-embeddings-word- vector-space.html (2015) (11 pages).
Pennington, et al., "GloVe: Global Vectors for Word Representation", retrieved online from URL:<https://nlp.stanford.edu/projects/glove.pdf>, 2014 (12 pages).
Rajagopalan, H., et al., "Tumorigenesis: RAF1 RAS oncogenes and mismatch-repair status", Nature, 418:934, Aug. 29, 2002 (1 page).
Shamir, A. "How to Share a Secret", Communications of the ACM, 22(11): Nov. 1979 (2 pages).
Shweta, et al., "Augmented Curation of Unstructured Clinical Notes from a Massive EHR System Reveals Specific Phenotypic Signature of Impending COVID-19 Diagnosis", arxiv.org/ftp/arxiv/papers/2004/2004.09338, accessed Sep. 24, 2020 (24 pages).
Wieting, J. et al., "Revisiting Recurrent Networks for Paraphrastic Sentence Embeddings", retrieved online from URL:<https://arXiv.org/pdf/1705.00364v1.pdf>, [cs.CL], Apr. 30, 2017 (12 pages).
Yao, Z. et al., "Dynamic Word Embeddings for Evolving Semantic Discovery", WSDM'18, Marina Del Rey, CA, USA, Feb. 5-9, 2018 (9 pages).

(56) References Cited

OTHER PUBLICATIONS

Zuccon, G., et al., "Integrating and Evaluating Neural Word Embeddings in Information Retrieval", ADCS, Parramatta, NSW, Australia, Dec. 8-9, 2015 (8 pages).
International Search Report and Written Opinion issued by the U.S. Patent and Trademark Office as International Searching Authority in International Application No. PCT/US20/42336, dated Sep. 30, 2020 (10 pages).

* cited by examiner

1000a

| | Discovery | Preclinical | Phase I | Phase II | Phase III | Market |
|---|---|---|---|---|---|---|
| Birch | AllerT:Bet v 1 COPs with alhydrogel | | | | | |
| Ragweed | | | | | | |
| Dust Mites | | | | | | |
| Next Candidates | | | | 1010 | | |

| | COP selection<br>In vitro tests<br>Mice studies | Manufacturing<br>Toxicology | Phase I/IIa | Phase IIb<br>300-400 patients | Phase III<br>800-1600 patients | |
|---|---|---|---|---|---|---|
| Estimated time | 1-2 years | 1 year | 1 year | 1-2 years | 1-2 years | |

SYSTEMS AND METHODS FOR POPULATING A STRUCTURED DATABASE BASED ON AN IMAGE REPRESENTATION OF A DATA TABLE

CROSS REFERENCE TO RELATED APPLICATIONS

This application claims priority under 35 U.S.C. § 119(e) to U.S. Provisional Application No. 62/874,830, filed Jul. 16, 2019, entitled "Systems and Methods for Populating a Structured Database Based on an Image Representation of a Data Table," the contents of which is incorporated herein in its entirety.

TECHNICAL FIELD

This application relates generally to databases and specifically to techniques for populating a structured database based on an image representation of a data table.

BACKGROUND

Database technologies allow vast quantities of data to be digitally stored and accessed in an efficient manner. For example, many emerging "big data" applications are enabled by developments in database technologies. Databases can be stored locally, in data centers, and/or in the cloud. Databases can also be distributed across multiple facilities.

Databases can be structured in a variety of ways. For example, relational databases model data as a set of tables, each of which is arranged in rows and columns. Query languages can be used to programmatically access data from databases and manipulate data stored in databases.

However, populating a database with information and keeping that information accurate and up-to-date can be a daunting task. Accordingly, it is desirable to develop improved techniques for populating databases, including automated techniques suitable for large-scale collection and storage of information in databases.

SUMMARY

Systems and methods for populating a structured database based on an image representation of a data table, according to embodiments of the present disclosure include accessing, by one or more computer processors, an image representation of a data table, the data table comprising one or more cells arranged in one or more rows and one or more columns, the one or more cells comprising a first cell that belongs to at least one first row and at least one first column, the first cell being populated with a first content object; providing, by the one or more computer processors, the image representation as an input to a neural network model that is trained to identify locations of content objects in image representations; executing, by the one or more computer processors, the neural network model to identify a location of the first content object in the image representation; identifying, by the one or more computer processors, a location of the first cell based on the location of the first content object; determining, by the one or more computer processors, that the first cell belongs to the at least one first row and the first column based on one or more of the location of the first cell and the first content object in relation to a plurality of content objects associated with the one or more rows and the one or more columns; associating the first content object with one or more categorical identifiers; and populating, by the one or more computer processors, a structured database with information associated with the first content object and the one or more categorical identifiers based on determining that the first cell belongs to the at least one first row and the at least one first column, the structured database including at least one data table row associated with the at least one first row and at least one data table column associated with the at least one first column.

In some embodiments, system and methods may also include creating one of at least one second column and at least one second row within the structured database based on determining that the first cell does not belong to the at least one first row and the at least one first column. In some embodiments, accessing the image representation includes receiving, by the one or more computer processors, a digital document via a computer network, the digital document comprising the data table; rendering, by the one or more computer processors, the digital document as a digital image; and locating, by the one or more computer processors, the image representation of the data table within the rendered digital image. In other embodiments, the location of the first content object comprises a first region that corresponds to least a portion of the first content object, and identifying the location of the first cell based on the location of the first content object includes expanding the first region in at least one direction, determining that the expanded first region includes a graphical marker that marks one or more of a row boundary and a column boundary, and, in response to determining that the expanded first region includes the graphical marker, identifying the expanded first region as corresponding to the location of the first cell.

In some embodiments, determining that the expanded first region includes the graphical marker includes identifying a plurality of pixel positions that correspond to an edge of the expanded first region, for each pixel position in the plurality of pixel positions, determining whether the pixel position is associated with a change in one or more of color and intensity along the at least one direction of expansion that exceeds a first predetermined threshold, determining that a count of the plurality of the pixel positions that are associated with the change in color or intensity exceeds a second predetermined threshold, and in response to determining that the number of the plurality of pixel positions exceeds the second predetermined threshold, determining that the expanded first region includes the graphical marker. In other embodiments, the location of the first cell comprises a row span along a row axis and a column span along a column axis, and determining that the first cell belongs to the at least one first row and the at least one first column based on the location of the first cell includes sorting at least a subset of the one or more cells in the data table based on a plurality of locations of the plurality of cells, starting with a selected cell among the subset of the one or more cells, recursively performing operations to identify one or more second cells that belong to the first row the operations includes determining at least one other cell with row spans that overlap a row span of the selected cell, identifying a nearest cell to the selected cell among the at least one other cell, identifying the nearest cell as belonging to the at least one first row, selecting the nearest cell as the next selected cell, identifying a header row among the one or more rows of the data table based on one or more header content objects that populate one or more header cells of the header row, determining that the column span of the first cell overlaps with a column span of a first header cell among the one or more header cells, and identifying the first cell as belonging to the first column, the first column being associated with the first header cell.

In some embodiments, identifying the header row among the one or more rows of the data table includes generating one or more text representations corresponding to the one or more header content objects; matching each of one or more text representations to a header dictionary, yielding a score vector comprising one or more confidence scores that correspond to the one or more text representations, each confidence score being based on a strength of the matching; determining a row score based on the score vector; and selecting the header row based on the row score. In other embodiments, determining a row score based on the score vector comprises calculating an aggregate metric based on one or more of the score vector and the one or more confidence scores. In yet other embodiments, selecting the header row includes comparing the row score to at least one secondary row score associated with the one or more rows of the data table, and, selecting the header row based on the relative value of the row score and the at least one secondary row score.

In some embodiments, the systems and methods include retrieving, by the one or more computer processors, a list of excluded header content objects not eligible to be part of the header row; determining, by the one or more computer processors, whether the one or more header content objects that populate one or more header cells of the header row are matched with the excluded header content objects, and; if the one or more header content objects are on the list of excluded header content objects, identifying, by the one or more computer processors, a replacement header row among the one or more rows of the data table based on one or more header content objects that populate one or more header cells of the header row. In other embodiments, the first content object comprises a graphical sequence object, populating the structured database comprises extracting sequence information from the graphical sequence object, and, the information associated with the first content object comprises the sequence information.

BRIEF DESCRIPTION OF THE DRAWINGS

FIGS. 10A-10D are simplified diagrams of pharmaceutical product information tables in which logical groupings of text have been automatically identified according to some embodiments.

Figure 11D:
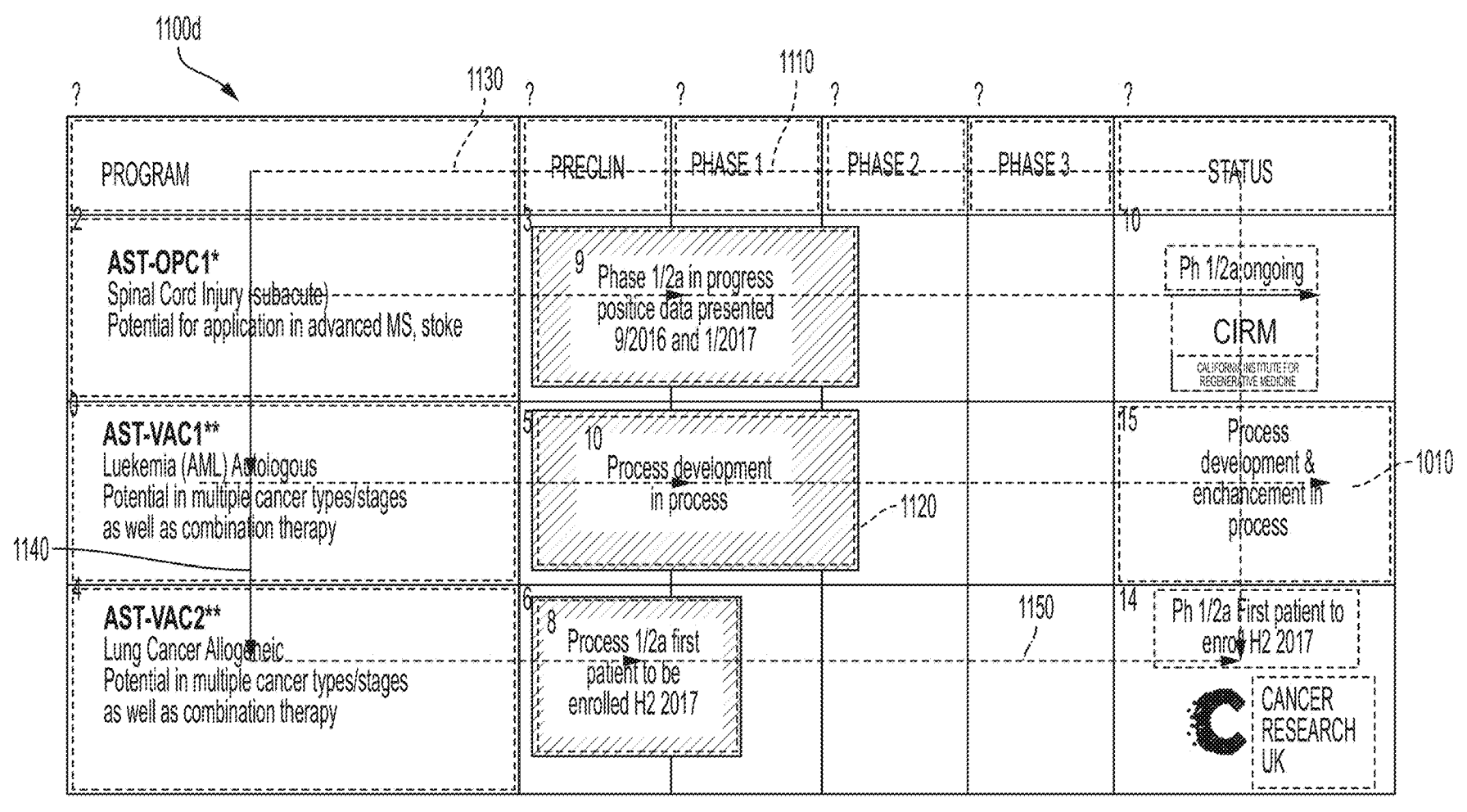
Figure 11E:
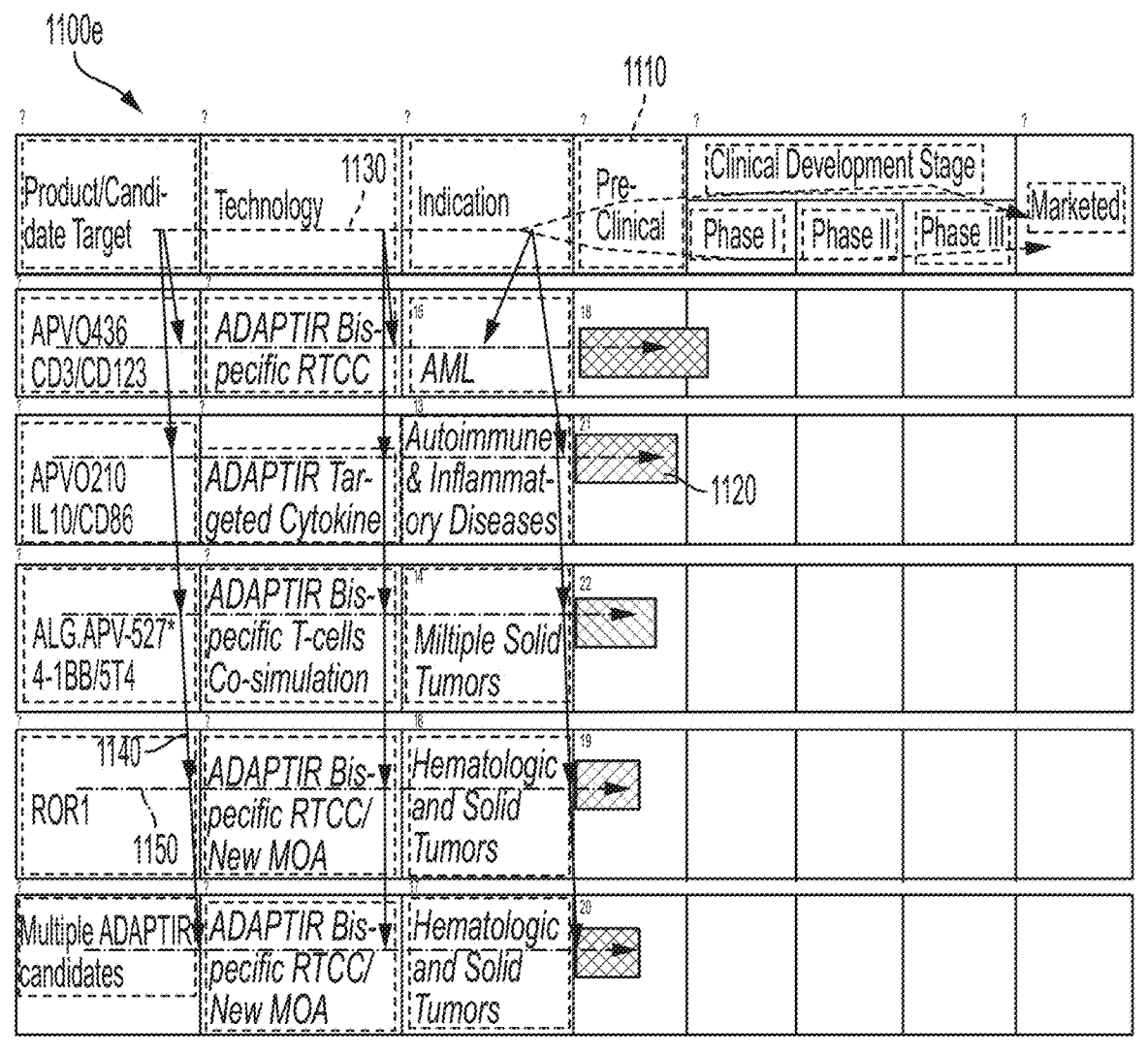

FIGS. 11A-11F are simplified diagrams of pharmaceutical product information tables in which cells have been identified as belonging to particular rows and columns according to some embodiments.

Figure 1:
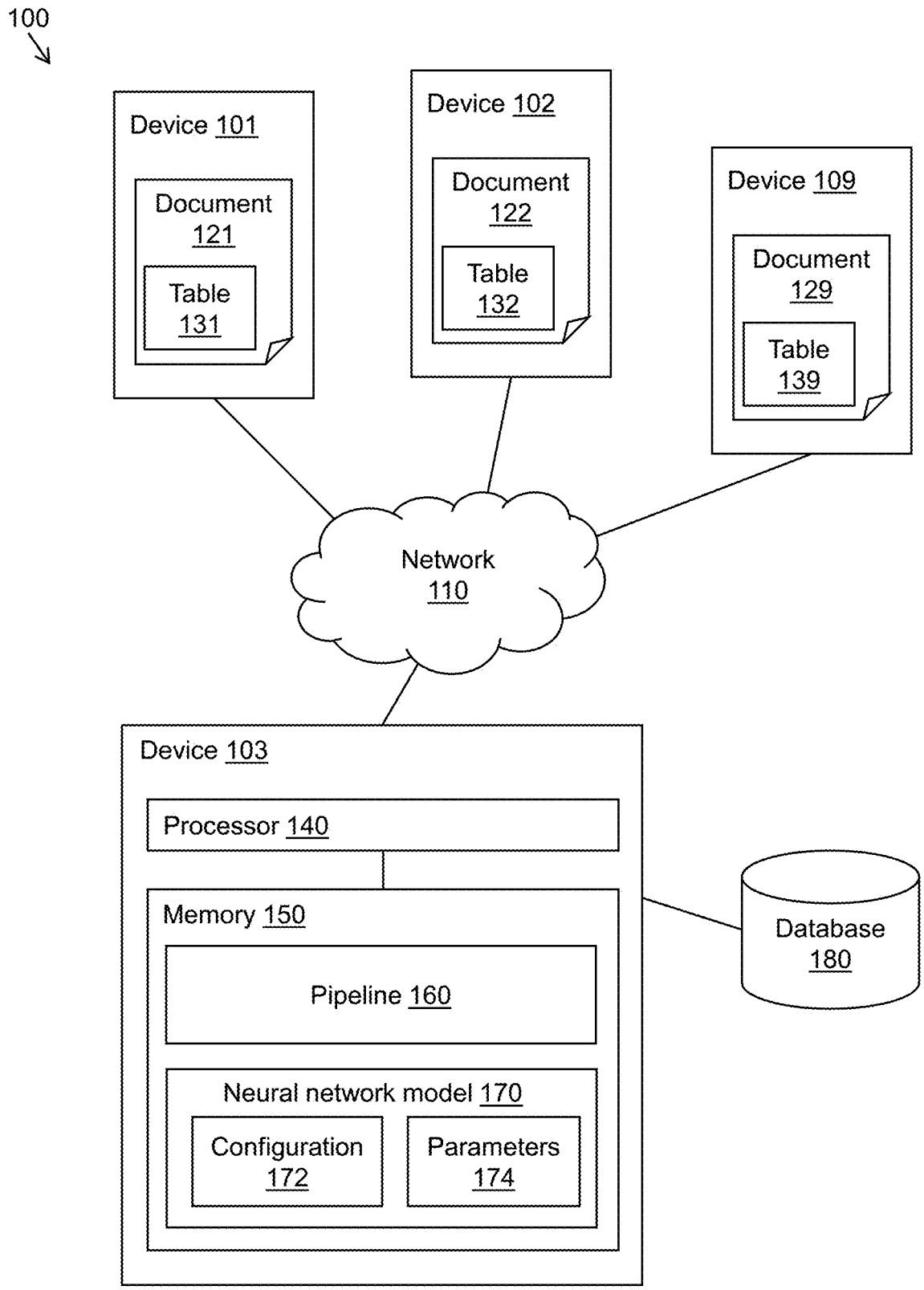
FIG. 1 is a simplified diagram of a system for populating a structured database based on an image representation of a data table according to some embodiments.

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Extracting information from tabular data can be a challenging task because of various formats and structure of tables. Rows and columns of data tables can have varying width, height, and spacing. Data tables may or may not have row or column markers to identify boundaries between adjacent rows or columns. Some data tables include merged cells. Furthermore, data tables can include complex backgrounds or cell shading schemes.

For example, bio-pharma companies sometimes provide web pages or downloadable reports that include pharmaceutical pipeline information. This information is often presented in a tabular format. For instance, pharmaceutical pipeline information tables can contain various information about products that are in development like Drug Name, Target, Mechanism of Action, Disease, and the current phase of development. The phase of development can be presented graphically, e.g., using progress bars of different shapes, size and colors. A given progress bar can span multiple columns, and even if column markers appear to split up the cell containing the progress bar into multiple columns, the cell should be treated as merged cell.

The present disclosure describes systems and methods for extracting information from data tables, such as those described above, and storing them in the structured database for subsequent retrieval and analysis.

FIG. 1 is a simplified diagram of a system 100 for populating a structured database based on an image representation of a data table according to some embodiments. System 100 includes a plurality of devices 101-109 that are communicatively coupled via a network 110. Devices 101-109 generally include computer devices or systems, such as personal computers, mobile devices, servers, or the like. Network 110 can include one or more local area networks (LANs), wide area networks (WANs), wired networks, wireless networks, the Internet, or the like. Illustratively, devices 101-109 may communicate over network 110 using the TCP/IP protocol or other suitable networking protocols.

One or more of devices 101-109 can store digital documents 121-129 and/or access digital documents 121-129 via network 110. For example, as depicted in FIG. 1, devices 101, 102, and 109 store digital documents 121, 122, and 129, respectively, and device 103 accesses digital documents 121-129 via network 110. Digital documents 121-129 can include webpages, digital files, digital images (including one or more frames of a video or an animation), or the like. Illustratively, digital documents 121-129 can be formatted as HTML/CSS documents, PDF documents, word processing documents (e.g., Word documents), text documents, slideshow presentations (e.g., PowerPoint presentations), image files (e.g., JPEG, PNG, or TIFF images), or the like. For efficient storage and/or transmission via network 110, documents 121-129 may be compressed prior to or during transmission via network 110. Security measures such as encryption, authentication (including multi-factor authentication), SSL, HTTPS, and other security techniques may also be applied.

According to some embodiments, device 103 may access one or more of digital documents 121-129 by downloading digital documents 121-129 from devices 101, 102, and 109. Moreover, one or more of devices 101, 102, or 109 can upload digital documents 121-129 to device 103. Digital documents 121-129 may be updated at various times. Accordingly, device 103 may access digital documents 121-129 multiple times at various intervals (e.g., periodically) to obtain up-to-date copies.

At least one of digital documents 121-129 can include one or more data tables 131-139. For example, data tables 131-139 can be embedded within digital documents 121-129, linked from within digital documents 121-129, or the like. Data tables 131-139 may be stored in a variety of formats, such as image formats, text formats (e.g., CSV or TSV files), markup language formats (e.g., XML or HTML/CSS), or the like.

As depicted in FIG. 1, device 103 includes a processor 140 (e.g., one or more hardware processors) coupled to a memory 150 (e.g., one or more non-transitory memories). Memory 150 stores instructions and/or data corresponding to a processing pipeline 160 and a neural network model 170 (or multiple neural network models). When executed by processor 140, processing pipeline 160 populates a database 180 based on image representations of data tables 131-139. Because digital documents 121-129 can generally be stored and accessed in a variety of formats, processing pipeline 160 may convert digital documents 121-129 and/or data tables 131-139 to an image representation in preparation for processing. This preliminary conversion step allows processing pipeline 160 to process, for example, data tables received in HTML/CSS format and PDF format using the same techniques.

Database 180 may be configured as a structured database with contents organized according to a schema or other logical relationships. For example, database 180 may be a relational database. Although database 180 is depicted as being coupled directly to device 103, it is to be understood that a variety of other arrangements are possible. For example, database 180 may be stored in memory 103, accessed via network 110, or the like.

During execution of processing pipeline 160, processor 140 executes a neural network model 170. Neural network model 170 is trained to make predictions based on input data. Neural network model 170 includes a configuration 172, which defines a plurality of layers of neural network model 170 and the relationships among the layers. Illustrative examples of layers include input layers, output layers, convolutional layers, densely connected layers, merge layers, and the like. In some embodiments, neural network model 170 may be configured as a deep neural network with at least one hidden layer between the input and output layers. Connections between layers can include feed-forward connections or recurrent connections.

One or more layers of neural network model 170 is associated with trained model parameters 174. The trained model parameters 174 are a set of parameters (e.g., weight and bias parameters of artificial neurons) that are learned according to a machine learning process. During the machine learning process, labeled training data is provided as an input to neural network model 170, and the values of trained model parameters 174 are iteratively adjusted until the predictions generated by neural network 170 to match the corresponding labels with a desired level of accuracy.

For improved performance, processor 140 may execute neural network model 170 using a graphical processing unit, a tensor processing unit, an application-specific integrated circuit, or the like.

Figure 2:
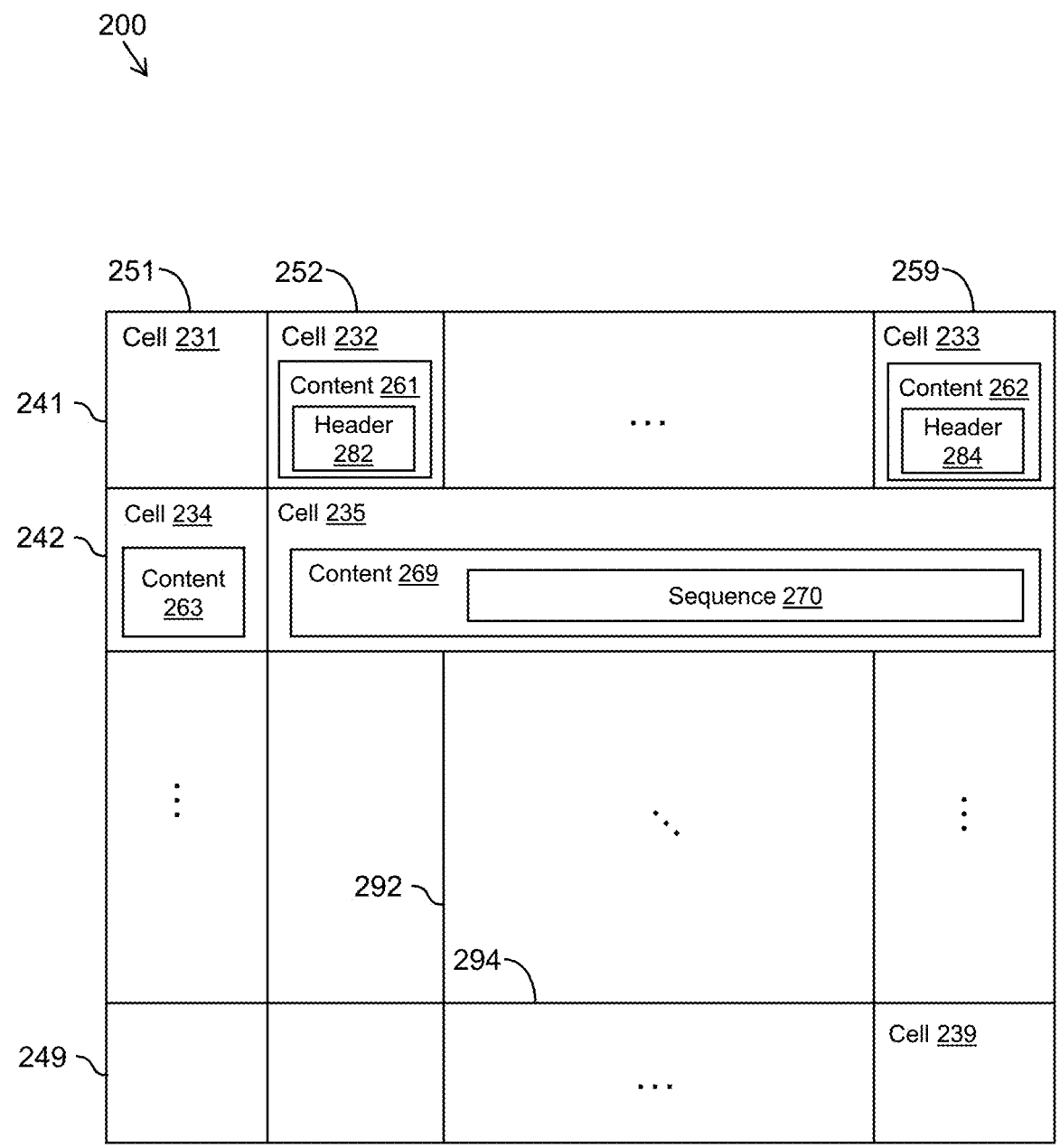
FIG. 2 is a simplified diagram of a data table according to some embodiments.

FIG. 2 is a simplified diagram of a data table 200 according to some embodiments. In some embodiments consistent with FIG. 1, data table 200 may generally correspond to at least one of data tables 131-139.

Data table 220 includes one or more cells 231-239 arranged in one or more rows 241-249 and one or more columns 251-259. In general, each cell belongs to at least one row and at least one column. Moreover, one or more of cells 231-239 may correspond to merged cells that occupy multiple rows, multiple columns, or both. For example, as depicted in FIG. 2, cell 235 corresponds to a merged cell that spans columns 252 through 259.

One or more of cells 231-239 are populated with content objects 261-269. Content objects 261-269 can include a variety of types of content, such as text, graphics, equations, animated content, or combinations thereof.

According to some embodiments, one or more of content objects 261-269 may include graphical sequence objects. For example, as depicted in FIG. 2, cell 235 is populated with a content object 269 that includes a graphical sequence object 270. Graphical sequence object 270 represents sequence information, such as timing or phase information. For example, graphical sequence object 270 may represent the development stage of a project, the clinical trial phase of a pharmaceutical product, or the like. In some embodiments, graphical sequence object 270 may depict the sequence information using a progress bar, where the length of the progress bar (e.g., the number of columns spanned by the progress bar) conveys the sequence information. In general, graphical sequence objects, such as graphical sequence object 270, can come in a wide variety of shapes, sizes, colors, textures, patterns, and the like.

One or more of rows 241-249 may be designated as a header row of data table 200. For example, as depicted in FIG. 2, the top row 241 is designated as a header row. The contents of the header row include information that describe the contents of other rows, such as text labels contained within the cells of the columns underneath the individual cells of the header row. For example, cells 232 and 233 in header row 241 are populated with content objects 261 and 262, respectively, that include header content objects 282 and 284, respectively. Header content object 282 includes information that describes the contents of other rows in column 252, and header content object 284 includes information that describes the contents of other rows in column 259.

In some embodiments, adjacent columns or rows of data table 200 may be demarcated using graphical markers, such as a graphical column marker 292 or a graphical row marker 294. Although graphical column marker 292 and graphical row marker 294 are depicted in FIG. 2 as solid lines, many alternatives are possible. For example, the graphical markers may include lines of varying styles (e.g., dashed lines, dotted lines, double lines, or the like), transitions in the background color or style (e.g., adjacent rows or columns may be demarcated by alternating between light and dark background colors or different textures), or the like. As will be appreciated by those skilled in the art, graphical markers may be applied in a wide variety of ways depending on the style and content of data table 200. Graphical markers may be included for some rows and/or columns and omitted for others.

Figure 3:
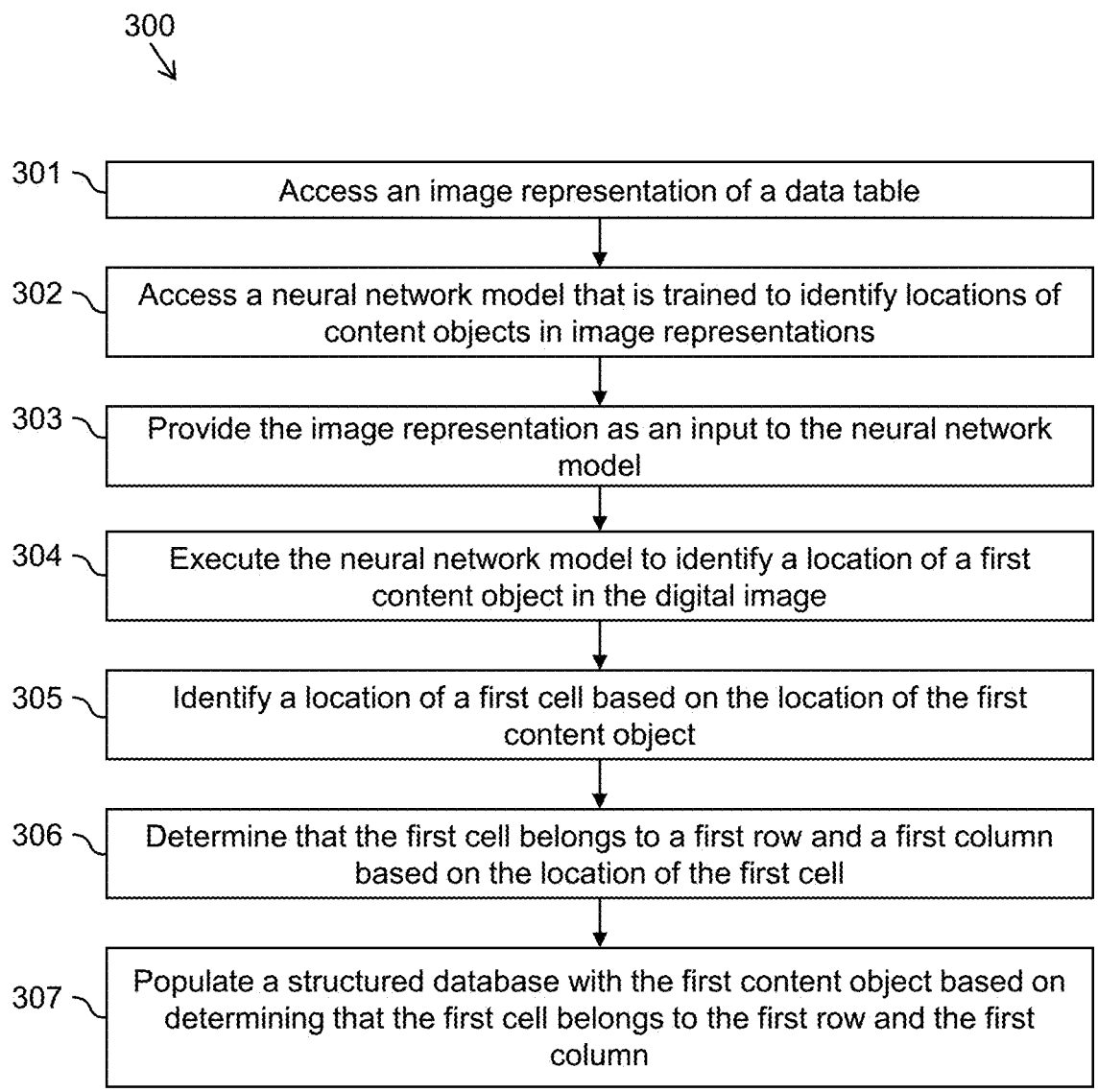
FIG. 3 is a simplified diagram of a method for populating a structured database based on an image representation of a data table according to some embodiments.

FIG. 3 is a simplified diagram of a method 300 for populating a structured database based on an image representation of a data table according to some embodiments. According to some embodiments consistent with FIGS. 1 and 2, method 300 may be performed by a computer processor, such as processor 140, based on instructions and/or data stored in a memory, such as memory 150.

At a process 301, an image representation of a data table, such as data table 200, is accessed. The image representation includes pixel data that represents the data table. Illustrative embodiments of accessing an image representation of the data table are described below with reference to FIG. 4.

At a process 302, a neural network model, such as neural network model 170, is accessed. The neural network model is trained to identify locations of content objects in image representations. Illustratively, the content objects may correspond to logical groupings of text, e.g., text boxes. Accordingly, the neural network model may be trained to identify logical groupings of text within image representations. For example, the neural network model can include a text detector that detects words in image representations, and a heuristic approach may be used identify logical groupings of the detected words.

In some embodiments, the neural network model may be trained to identify logical groupings of text directly. An example of a neural network model that can identify logical groupings of text in this manner is the YOLOv3 neural network, which is described in Joseph Redmon and Ali Farhadi, *YOLOv3: An Incremental Improvement*, Technical report, 2018, which is incorporated by reference herein in its entirety.

In some embodiments, the neural network model may be trained using transfer learning to identify one or more types of content objects that are expected to be found in data tables. For example, the neural network may be trained to identify (1) logical groupings of text within a cell (e.g., text boxes) and (2) graphical sequence objects (e.g., progress or phase bars). Subsequent processes of method 300 may be performed for each type of content object identified by the neural network model.

At a process 303, the image representation is provided as an input to the neural network model. Various pre-processing steps may be performed to prepare the image representation for the neural network model. These pre-processing steps can include cropping and/or padding the image representation to fit a predetermined aspect ratio, scaling the dimensions of image representation to fit a predetermined size, normalizing the color or intensity of the pixels in the image representation, reducing the number of color channels of the image representation (e.g., converting the image representation from color to grayscale), or the like.

At a process 304, the neural network model is executed to identify a location of a first content object in the image representation. The first content object may include logical grouping of text, a graphical sequence object, or the like. According to some embodiments, the neural network model may be executed using specialized computing hardware, such as a graphics processing unit (GPU) or an application-specific integrated circuit (ASIC). The location of the first content object can include coordinates of a point associated with the first content object (e.g., the center position of the first content object), a horizontal and vertical span of the first content object, a bounding rectangle (or other suitable shape) that surrounds the first content object, or the like.

More generally, executing the neural network model can identify locations of a plurality of content objects in the image representation. Although process 304 and subsequent processes of method 300 are described with reference to a first content among the plurality of content objects, these processes may be repeated for each of the plurality of identified content objects.

At a process 305, a location of a first cell is identified based on the location of the first content object. The first cell corresponds to a cell of the data table that is populated with the first content object. The first cell generally corresponds to a region of the image representation that is equal to or larger than the first content object, as the first content object is contained within the first cell. Accordingly, identifying the location of the first cell can be accomplished by expanding a region corresponding to the first content object until the expanded region reaches the boundaries associated with the first cell. Illustrative embodiments of methods for identifying the location of the first cell in this manner are described below with reference to FIGS. 5 and 6. According to some embodiments, process 305 may be repeated for each of a plurality of content objects identified at process 304, yielding locations of a corresponding plurality of cells in the data table. In this regard, each of the plurality of cells may be associated with a different content object and may have a different location.

At a process 306, it is determined that the first cell belongs to at least one first row and at least one first column based on the location of the first cell. In general, a cell in the data table belongs to a single row and a single column. However, the first cell may correspond to a merged cell, in which case the first cell can span multiple rows, multiple columns, or both. Illustrative embodiments of methods for determining that the first cell belongs to the at least one first row and at least one first column are described below with reference to FIG. 7.

At a process 307, a structured database, such as database 180, is populated with information associated with the first content object based on determining that the first cell belongs to the first row and the first column. Populating the structured database may include extracting the information based on the first content object. For example, when the first content object includes a logical grouping of text, populating the structured database may include converting the logical grouping of text from an image representation to a sequence of digital characters.

When the first content object includes a graphical sequence object, populating the structured database may include extracting sequence information from the graphical sequence object. For example, when the graphical sequence object includes a progress or phase bar, the sequence information may be determined based on a length of the progress or phase bar or a number of rows or columns spanned by the progress or phase bar. In some embodiments, the length of the progress or phase bar is first aligned to the columns or rows of the table before determining the sequence information. In some embodiments, determining the length of the progress or phase bar may include distinguishing between filled and unfilled portions of the bar and identifying the length of the filled portion. In a scenario where a progress or phase bar spans a portion of a column or row, a percentage of overlap may be determined. For example, if a phase bar spans 60% of a column corresponding to Phase II, it may be determined that Phase II is 60% complete.

According to some embodiments, one or more processes of method 300 may be repeated until the structured database is populated with information associated with each content object in the data table. Once populated, various types of analysis or visualization may then be performed based on the information stored in the structured database. As an illustrative example, in some embodiments, a semantic analysis may be performed based on the information stored in the structured database, e.g., using techniques described in U.S. Pat. No. 10,360,507, filed Sep. 22, 2017, entitled "Systems, Methods, and Computer Readable Media for Visualization of Sematic Information and Inference of Temporal Signals Indicating Salient Associations Between Life Science Entities," which is incorporated by reference herein in its entirety.

Figure 4:
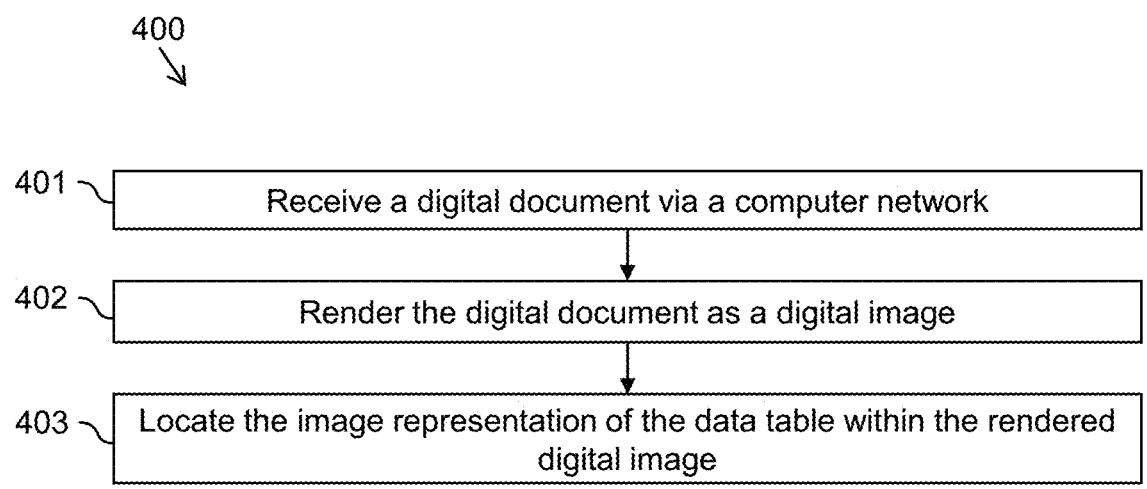
FIG. 4 is a simplified diagram of a method for accessing an image representation of a data table according to some embodiments.

FIG. 4 is a simplified diagram of a method 400 for accessing an image representation of a data table according to some embodiments. According to some embodiments consistent with FIGS. 1-3, method 400 may be used to implement process 301 of method 300.

At a process 401, a digital document, such as digital documents 121-129, is received via a computer network, such as network 110. The digital document can be transmitted and received in a variety of formats. For example, the digital document can include an HTML/CSS document, an image file (e.g., a JPEG, PNG, or TIFF image), a PDF document, a text or word processing document, a slideshow presentation, a spreadsheet, or the like.

At a process 402, the digital document is rendered as a digital image. For example, rendering the digital document may include transforming the digital document into an array of pixel values that can be used for further processing (and, optionally, displayed on a display screen). A rendering engine may be selected to render the digital document into a uniform image format based on the format in which the digital document is received. For example, when the digital document includes an HTML/CSS document, a web browser may be selected to render the document. Similarly, when the digital document includes a PDF document, a PDF viewer may be selected to render the document. In each case, the digital document may be rendered into a uniform digital image format that is independent of the format of the of received digital documents. In this manner, flexibility is provided to handle a wide variety of types of received digital documents. In some embodiments, metadata associated with the received digital document (e.g., metadata from a PDF file describing the contents of a data table included within the PDF file) may be removed from or otherwise not included in the rendered digital image.

At a process 403, the image representation of the data table is located within the rendered digital image. One skilled in the art would appreciate that a wide variety of object detection techniques may be used to locate an image representation of a data table within a digital image. According to some embodiments, a second neural network model may be trained to detect and localize data tables within digital images. This second neural network model can then be executed using the rendered digital image as an input to predict the location of the image representation of the data table. In illustrative embodiments, the neural network model may correspond to an SSD 512 neural network model that is trained using transfer learning to detect and localize an image representation of a data table. The SSD 512 neural network model is described in further detail in Wei Liu et al., *SSD: Single Shot MultiBox Detector*, European Conference on Computer Vision, 2016, which is incorporated by reference herein in its entirety.

In some embodiments, method 400 may be performed at multiple times to refresh the data table over time. For example, when the data table includes phase or progress information that changes or evolves over time, method 400 may be performed periodically to track the phase or progress indicated. A method, such as method 300, may then be performed each time the data table is updated to populate the structured database based on the updated contents of the data table.

Figure 5:
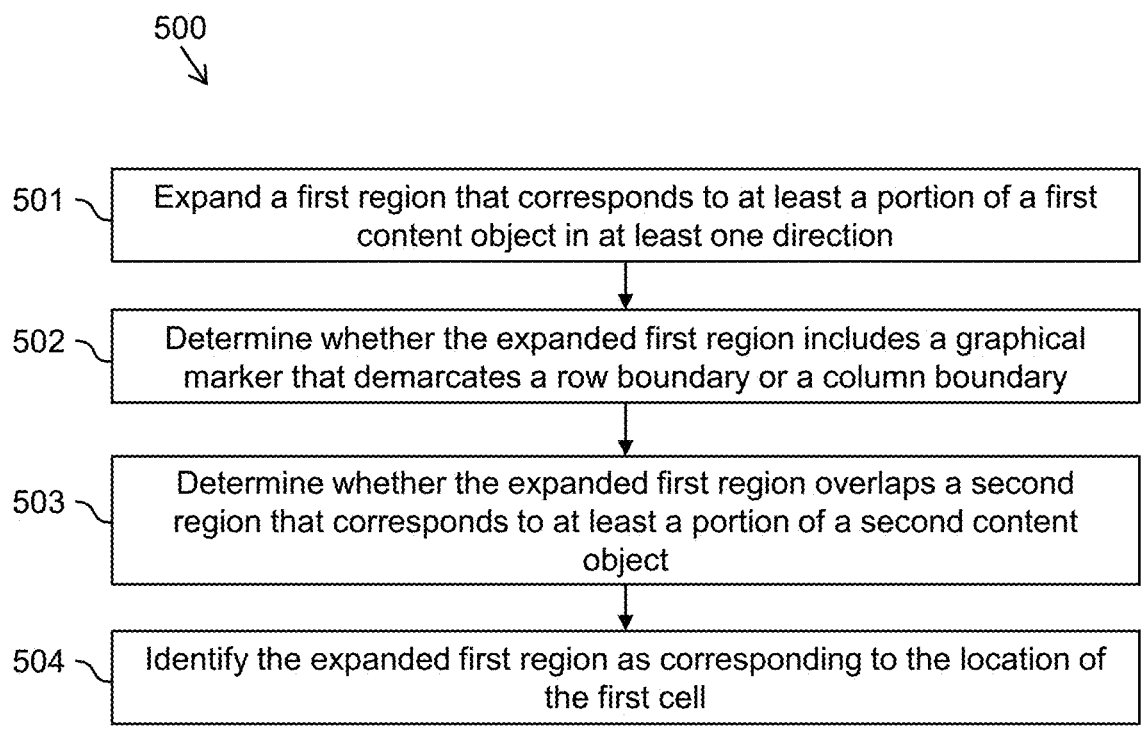
FIG. 5 is a simplified diagram of a method for identifying a location of a cell based on a location of a content object according to some embodiments.

FIG. 5 is a simplified diagram of a method 500 for identifying a location of a cell based on a location of a content object according to some embodiments. According to some embodiments consistent with FIGS. 1-3, method 500 may be used to implement process 305 of method 300.

At a process 501, a first region that corresponds to at least a portion of a first content object is expanded in at least one direction. For example, the first region can correspond to a bounding rectangle that surrounds the first content object, e.g., a box around a logical grouping of text. In some embodiments, the edges of the bounding rectangle may be aligned to be parallel with the expected orientation of the rows and/or columns of the data table. For example, where the rows and columns correspond to the horizontal axis and vertical axis, respectively, of the image representation, the edges of the bounding rectangle may likewise be aligned with the horizontal axis and the vertical axis of the image representation. However, other shapes (e.g., nonrectangular shapes) and/or orientations of the first region are equally applicable to the systems and methods described herein. When the first region corresponds to a bounding rectangle, to expand this first region, at least one of the four edges of the bounding rectangle can be shifted outward from the center of the bounding rectangle. The expansion may occur in steps of a predetermined size, e.g., in one-pixel increments.

At a process 502, it is determined whether the expanded first region includes a graphical marker that demarcates a row boundary or a column boundary. The graphical marker can include a line demarcating the row boundary or column boundary. The line can generally have any suitable style (e.g., solid, dashed, patterned, colored, etc.). The graphical marker can also include a transition that conveys the row boundary or column boundary, such as a change in the background color or texture. More generally, the graphical marker can include any suitable type of discontinuity that conveys that a boundary between rows or columns exists at a given position in the image. A variety of image processing techniques can be used to detect whether such a graphical marker is included within the expanded first region. Illustrative embodiments of methods for determining that the expanded first region includes the graphical marker are described below with reference to FIG. 6.

At a process 503, it is determined whether the expanded first region overlaps a second region that corresponds to at least a portion of a second content object. For example, the expanded first region may overlap with the second region when the first and second content objects are in adjacent rows or columns and there is no graphical marker between the adjacent rows or columns. In these scenarios, the first and second regions may expand during process 501 and may continue growing until they overlap with one another. Accordingly, comparing the first region to other identified regions in the image, including the second region, may be performed to detect cells that do not have graphical markers defining their boundaries.

At a process 504, the expanded first region is identified as corresponding to the location of the first cell in response to (a) determining at process 502 that the expanded first region includes the graphical marker, or (b) determining at process 503 that the expanded first region overlaps the second region. In some embodiments, one or more processes of method 500 may be repeated until each boundary of the cell (e.g., two row boundaries and two column boundaries) is determined in similar fashion.

Figure 6:
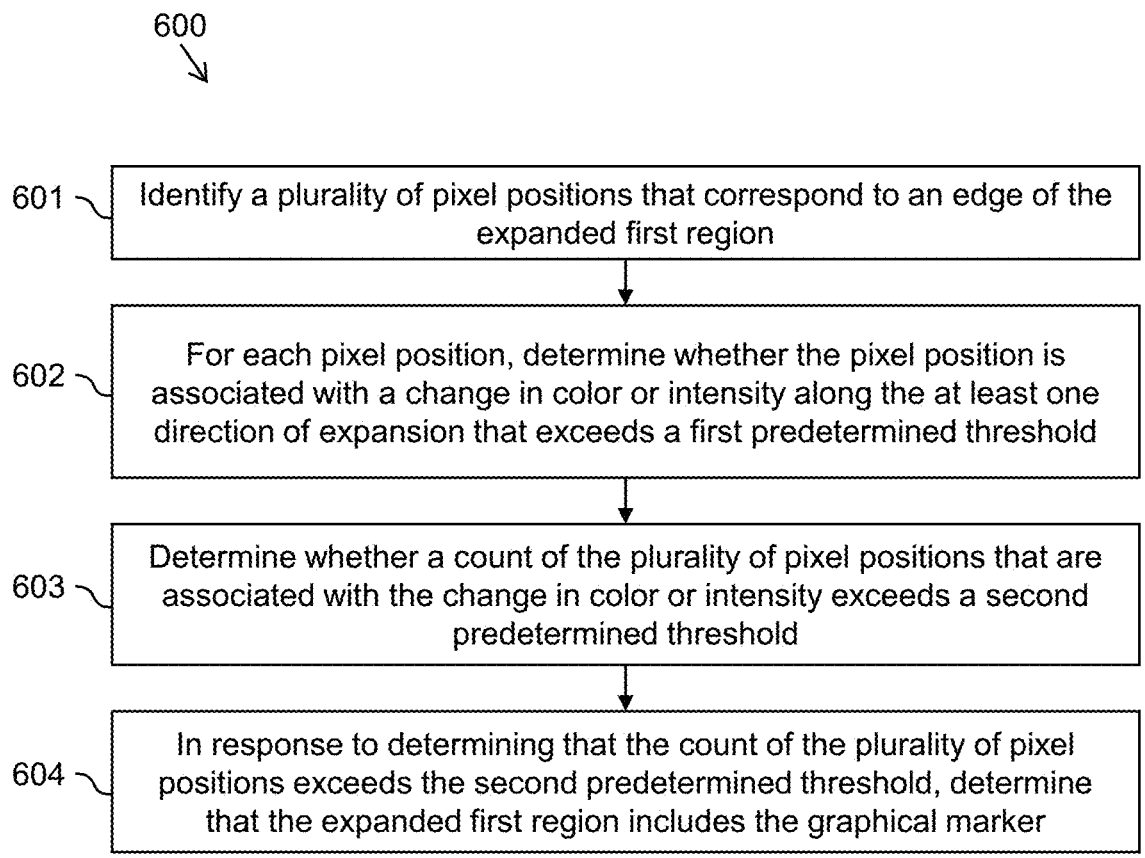
FIG. 6 is a simplified diagram of a method for determining that a region includes a graphical marker according to some embodiments.

FIG. 6 is a simplified diagram of a method 600 for determining that a region includes a graphical marker according to some embodiments. According to some embodiments consistent with FIGS. 1-5, method 600 may be used to implement process 502 of method 500.

At a process 601, a plurality of pixel positions that correspond to an edge of an expanded first region are identified. For example, when the expanded first region corresponds to an N×M rectangle, the plurality of pixel positions can include the N pixels along the right or left edges of the expanded first region or the M pixels along the top or bottom edges of the expanded first region. According to some embodiments, the expanded first region generally corresponds to the expanded first region associated with process 501.

At a process 602, for each pixel position, it is determined whether the pixel position is associated with a change in color or intensity along the at least one direction of expansion that exceeds a first predetermined threshold. For example, when the plurality of pixel positions correspond to the left edge of an N×M bounding rectangle, each pixel may be compared to a neighboring pixel to its right. During the comparison, a difference between the pixel and the neighboring pixel (e.g., an intensity difference, a color difference, or the like) can be computed. The difference can be an absolute difference, a relative difference, or the like. The difference is then compared to the first predetermined threshold. The first predetermined threshold is preferably set to a value that is high enough to avoid false positives (e.g., erroneously detecting a row or column boundary based on a gradual background gradient) and low enough to detect subtle types of graphical markers (e.g., a small but abrupt transition in background color between alternating rows).

At a process 603, it is determined whether a count of the plurality of pixel positions that are associated with the change in color or intensity, as determined at process 602, exceeds a second predetermined threshold. The count can correspond to an absolute count of the number of pixels or a relative count (e.g., a percentage of the total number of pixels). Some types of graphical markers may be continuous (e.g., a solid line), in which case each of the plurality of pixels is likely to be included in the number. However, other types of graphical markers may be discontinuous (e.g., a dashed line), in which fewer than all of the plurality of pixels are likely to be included in the number. Accordingly, the second predetermined threshold is preferably set to a number that is low enough to detect discontinuous types of graphical markers without introducing false positives.

At a process 604, it is determined that the expanded first region includes the graphical marker in response to determining that the count of the plurality of pixel positions exceeds the second predetermined threshold. Upon this determination, a method, such as method 500, may proceed to identify the region as corresponding to the location of a cell, as described in process 504.

Figure 7:
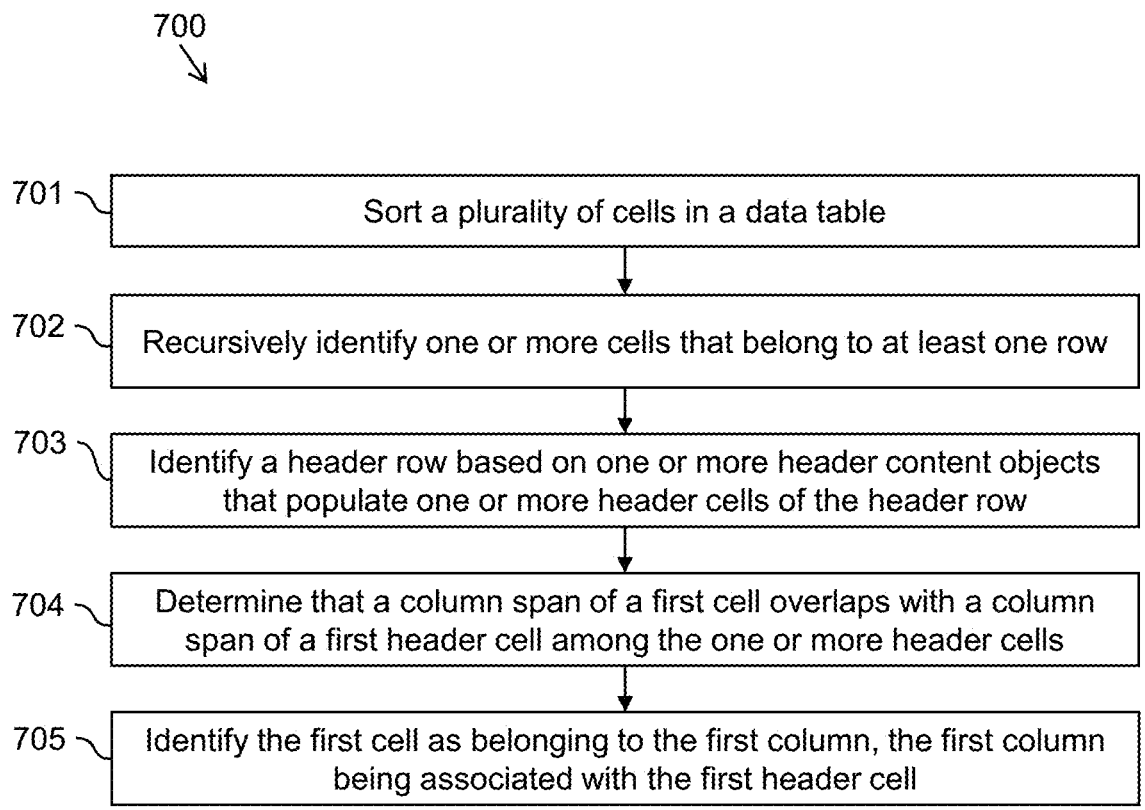
FIG. 7 is a simplified diagram of a method for determining that a cell belongs to at least one row and at least one column based on a location of the cell according to some embodiments.

FIG. 7 is a simplified diagram of a method 700 for determining that a cell belongs to at least one row and at least one column based on a location of the cell according to some embodiments. According to some embodiments consistent with FIGS. 1-3, method 700 may be used to implement process 306 of method 300.

At a process 701, a plurality of cells in a data table (e.g., the plurality of cells identified at process 305 of method 300) are sorted based on their identified locations. For example, the plurality of cells can be sorted in order along a column axis (e.g., left to right or right to left) and a row axis (e.g., top to bottom or bottom to top).

At a process 702, one or more cells among the plurality of sorted cells that belong to the at least one row are identified recursively. According to some embodiments, recursively identifying the one or more cells that belong to the at least one row may include recursively performing the following operations, starting with a first selected cell: (1) determining a set of cells with row spans that overlap a row span of the currently selected cell; (2) identifying a nearest cell among the set of cells; (3) identifying the nearest cell as belonging to the at least one row; and (4) selecting the nearest cell as the next selected cell. The row span corresponds to a range of positions occupied by a cell along the row axis (e.g., a vertical axis of the data table). These operations may be performed left-to-right (identifying the nearest cell to the right of the selected cell) and right to left (identifying the nearest cell to the left of the selected cell) until each cell in the at least one row is identified.

At a process 703, a header row is identified based on one or more header content objects that populate one or more header cells of the header row. The header content objects generally describe the contents of corresponding columns, e.g., by providing indicators or labels. Accordingly, a given column of the data table can be identified based on the corresponding header content object for that column. Thereafter, the corresponding individual cells within that column will have similar content objects sharing a common characteristic or data type as identified by the header content object for that column. Illustrative embodiments of methods for identifying the header row are described below with reference to FIG. 8.

At a process 704, it is determined that a column span of a first cell overlaps with a column span of at least one first header cell among the one or more header cells. A column span corresponds to a range of positions occupied by a cell along the column axis (e.g., a horizontal axis of the data table). When the column spans of different cells overlap with each other, then it is likely that the two cells belong to the same column. In the case of a merged cell, the column span of the first cell can overlap with multiple header cells.

At a process 705, the first cell is identified as belonging to the at least one first column, the at least one first column being associated with the at least one first header cell. However, in cases where there is no header row, or when there is no header cell for the at least one first column, alternative approaches may be used. For example, the at least one first column may be assigned a default header, such as a non-descript place holder header text, when no header cell is present.

Moreover, an identifier or label for the at least one first column may be predicted and assigned based on a semantic analysis of the contents of the at least one first column. For example, when there is no header cell for the at least one first column, the text contained in the cells of the column may be extracted and analyzed using an entity extraction engine to determine the types of entities contained in the column. In some embodiments, the entity extraction engine can associate the text contained in the cells based on the types of entities without having the header cell to provide context within the data structure. For example, techniques for identification of entity types disclosed in U.S. Pat. No. 10,360,507 may be used for this purpose, among others. An identifier or label for the column may then be assigned based on the types of entities in the column, and the structured database can be populated based on the identifier or label. The identifier or label may be in the form of qualitative labels such as noting types of drugs, target, disease, mechanism of action, or phase of trials, among others. Various pre-processing steps may be applied to the text in preparation for sending the text to the entity extraction engine. For example, the text may be sent to a spell correction engine to correct misspelled or irregularly spelled text in preparation for the entity extraction engine. Illustratively, in the context of pharmaceutical or biomedical applications, the spell correction engine may include a biomedical spell correction engine, and the entity extraction engine may include a biomedical entity extraction engine. Illustrative examples of entity type recognized by a biomedical entity extraction can include, but are not limited to, a gene, a drug, a tissue, a disease, an organic chemical, a company, a diagnostic procedure, and a physiologic function.

Figure 8:
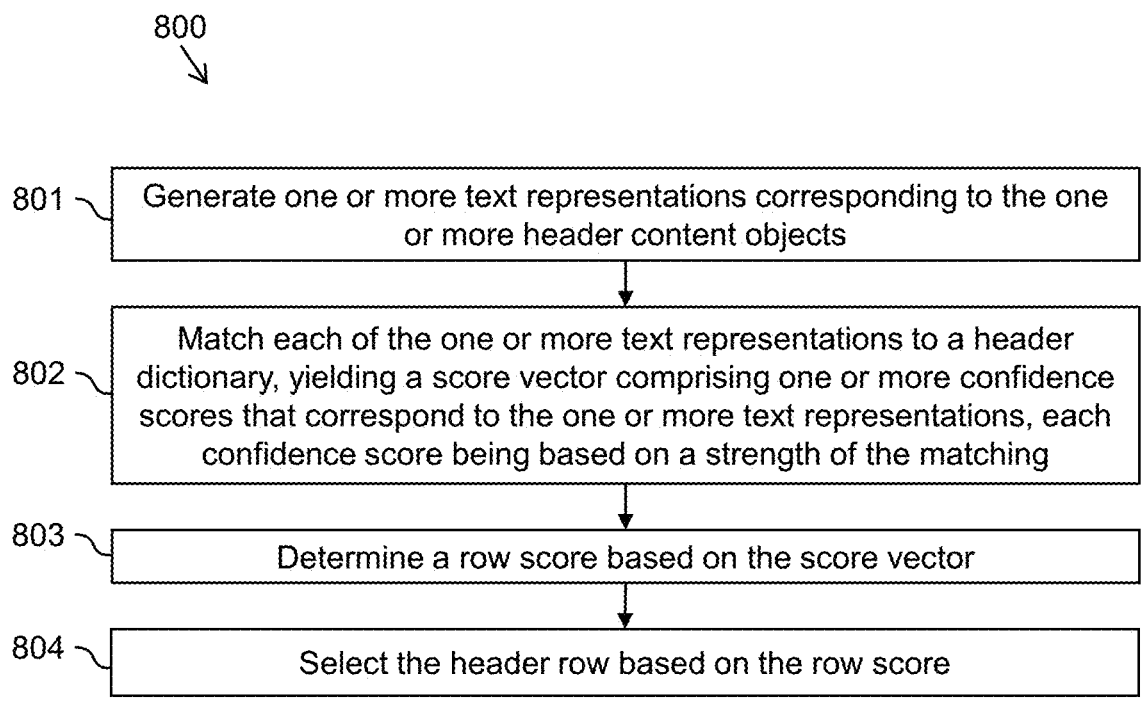
FIG. 8 is a simplified diagram of a method for identifying a header row among one or more rows of a data table according to some embodiments.
Figures 9A, 9B, 9C:
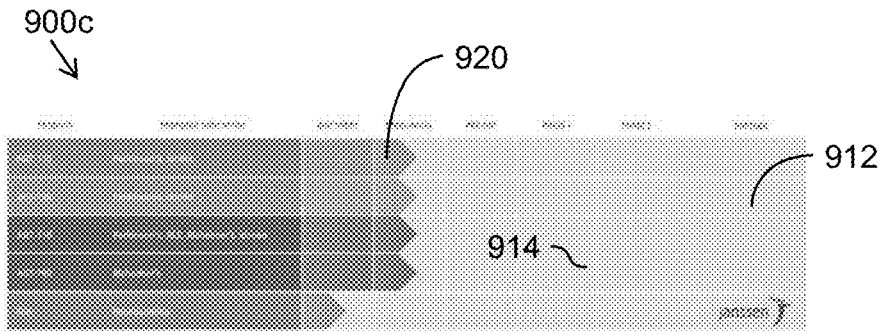
FIGS. 9A-9G are simplified diagrams of pharmaceutical product information tables according to some embodiments.
Figure 9D:
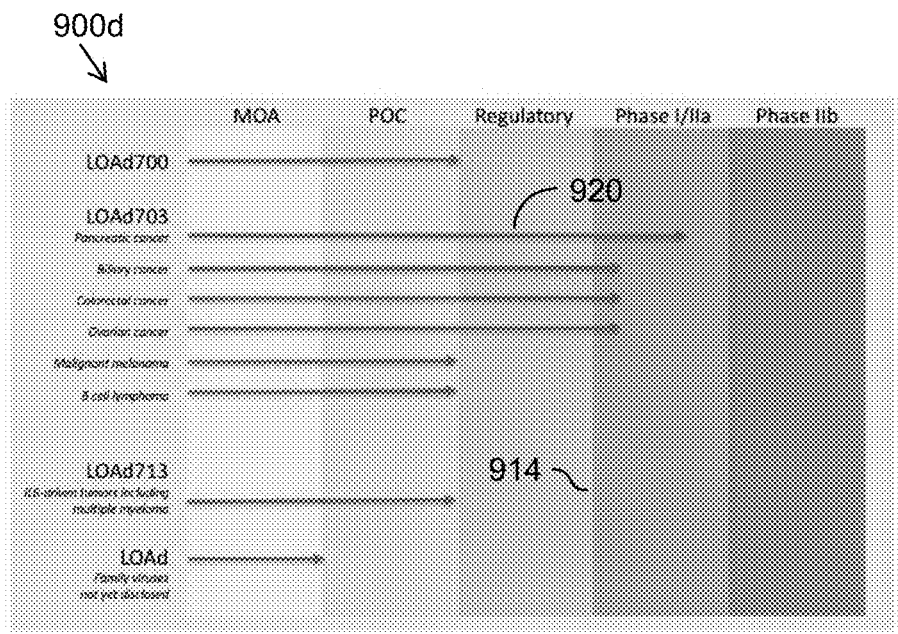
Figure 9E:
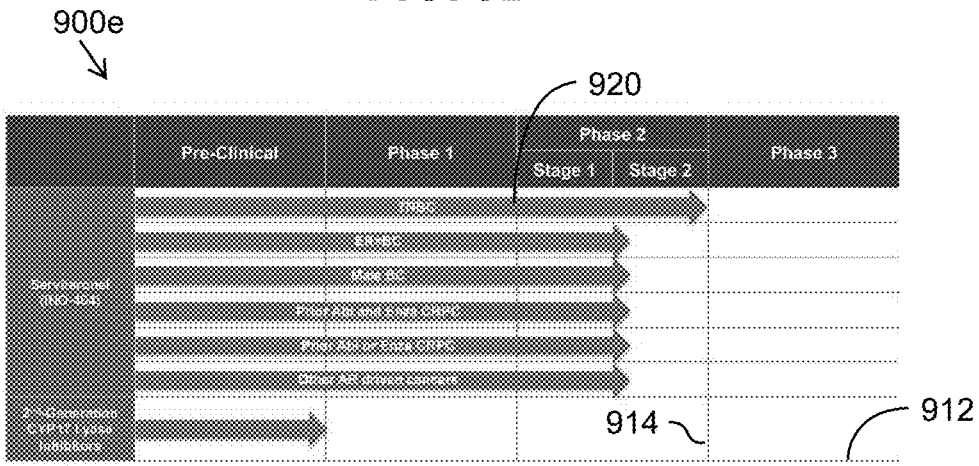
Figure 9F:
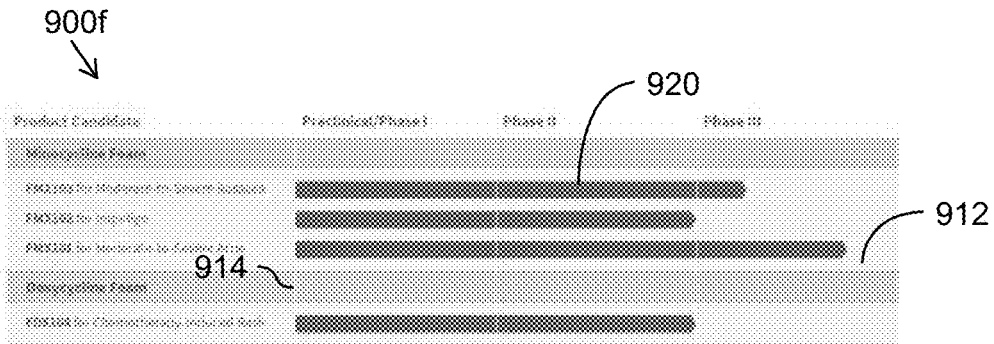
Figure 9G:
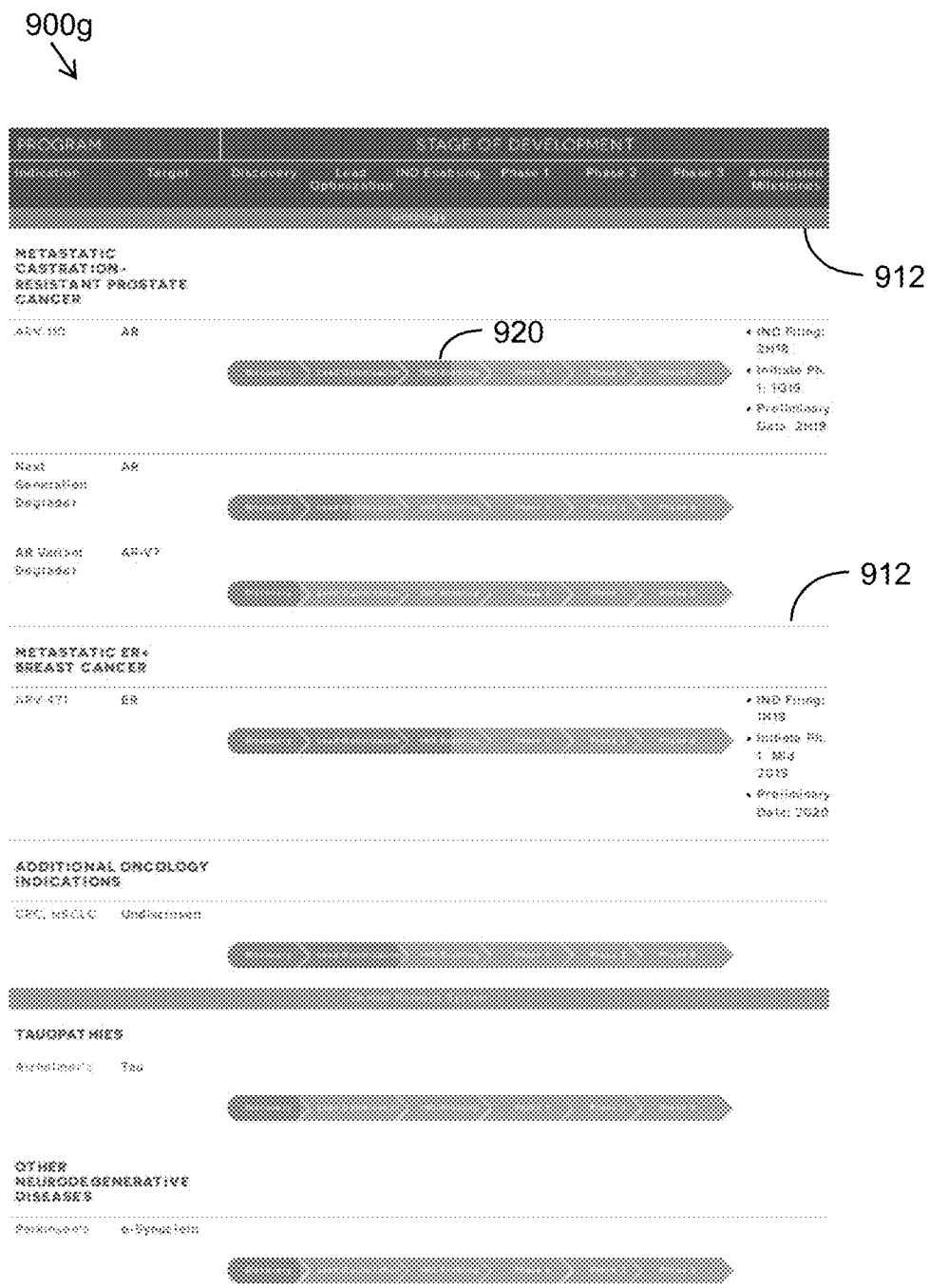
Figure 10B:
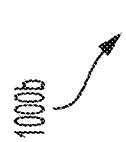
Figure 10C:
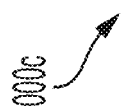
Figure 10D:
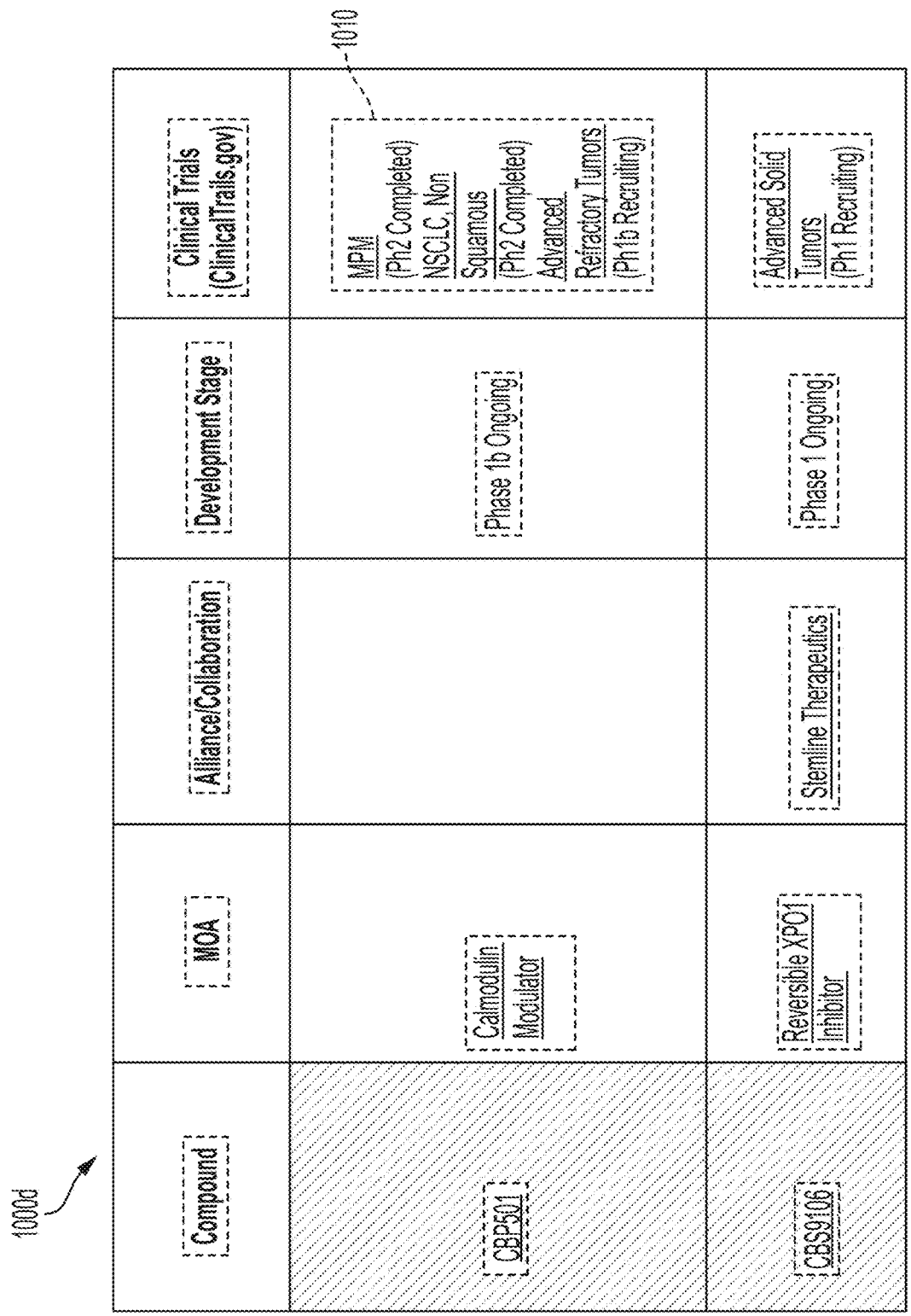
Figure 11A:
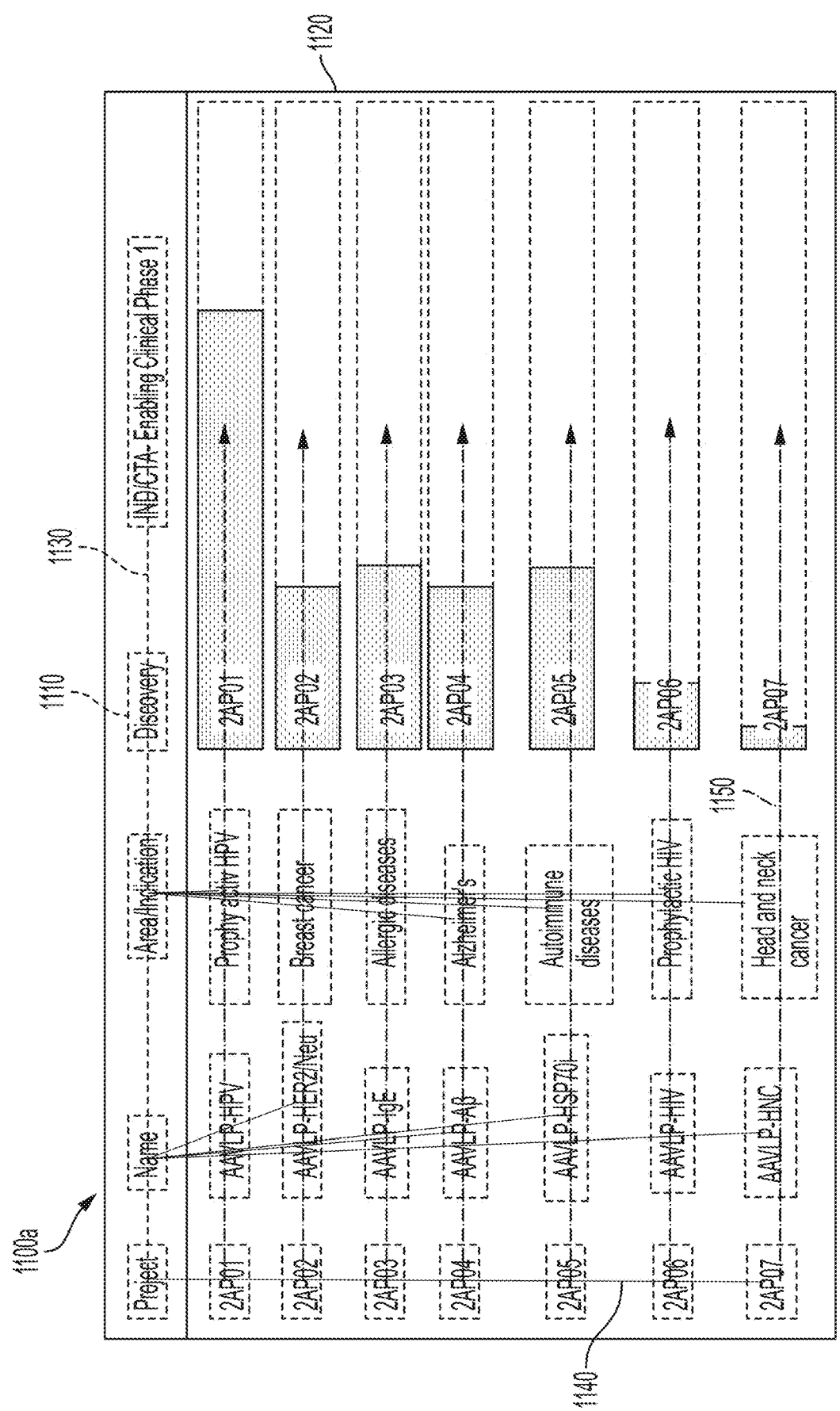
Figure 11B:
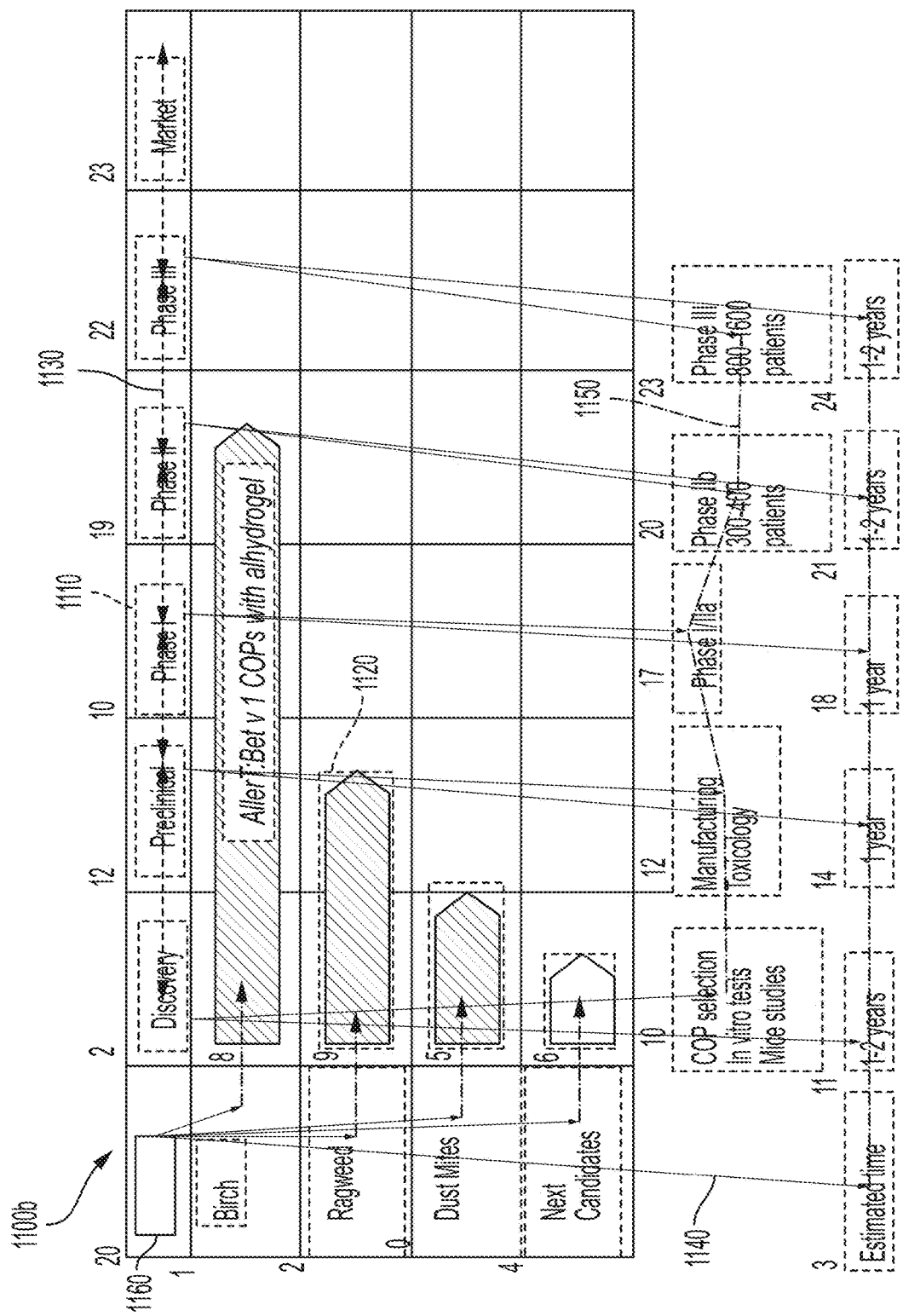
Figure 11C:
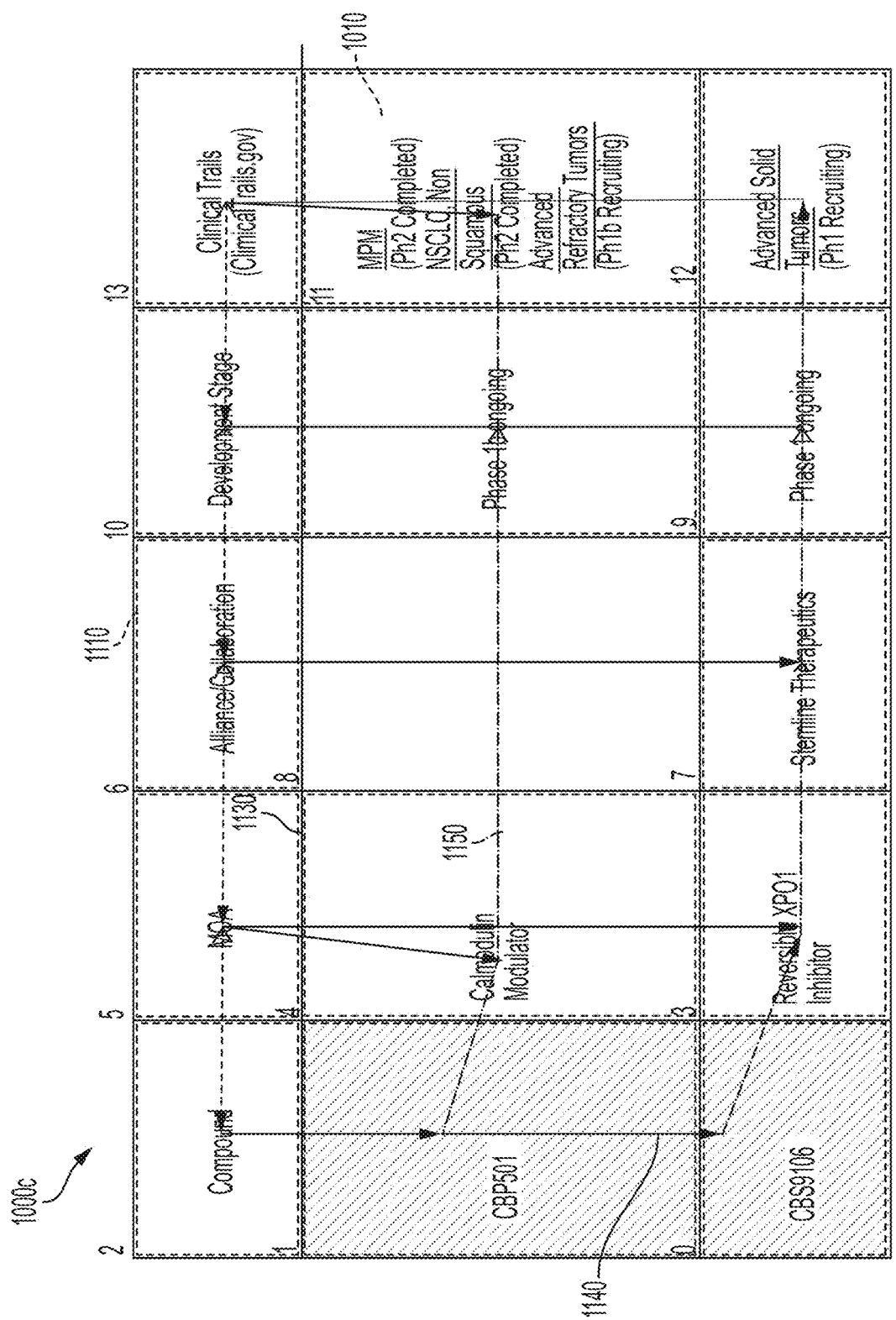
Figure 11F:
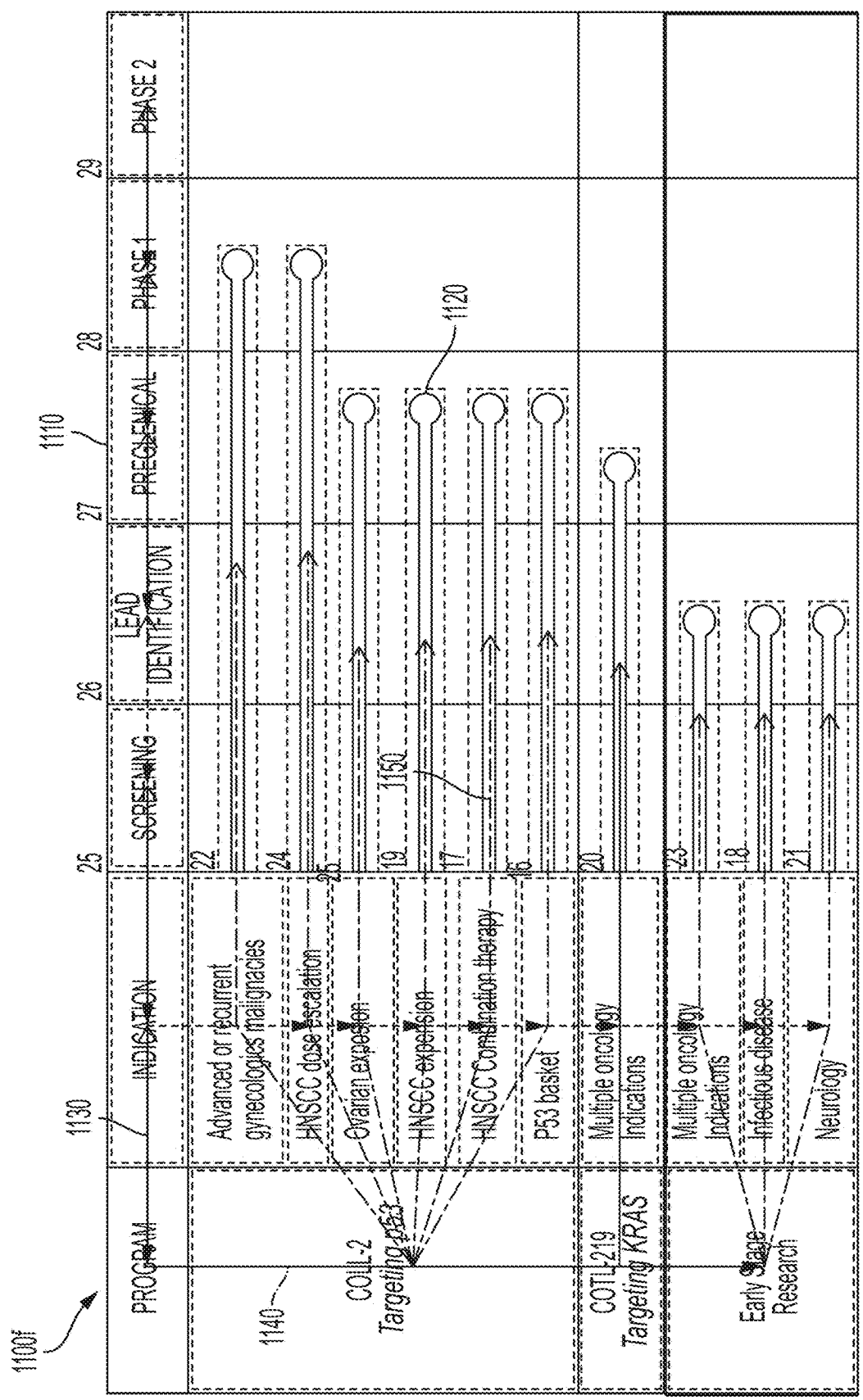

FIG. 8 is a simplified diagram of a method 800 for identifying a header row among one or more rows of a data table according to some embodiments. According to some embodiments consistent with FIGS. 1-7, method 800 may be used to implement process 702 of method 700.

At a process 801, one or more text representations corresponding to the one or more header content objects are generated. The one or more text representations can include a set of digital characters. According to some embodiments, optical character recognition (OCR) may be used to generate the one or more text representations based on an image representation of the data table.

At a process 802, each of the one or more text representations are matched to a header dictionary. This yields a score vector that includes one or more confidence scores corresponding to the one or more text representations. Each confidence score is based on a strength of the matching. For example, each confidence score may be determined based on the Levenshtein distance, which provides a mechanism to account for errors and uncertainties at earlier process steps (e.g., OCR errors). Illustratively, in the context of pharmaceutical product information tables, the header dictionary includes entries that correspond to headers that are expected to be included in such tables, such as Drug Name, Disease/Target, Mechanism of Action, Phase, etc. In some embodiments, the header dictionary is created by a subject matter expert ("SME") to manually identify common entries expected within the data system. The header dictionary can be updated to account for new common entity types as time progresses, using either manual or automated text recognition systems. Similar to the discussion above, in some embodiments, a semantic analysis may be performed based on the information stored in the structured database, e.g., using techniques described in U.S. Pat. No. 10,360,507, filed Sep. 22, 2017, entitled "Systems, Methods, and Computer Readable Media for Visualization of Sematic Information and Inference of Temporal Signals Indicating Salient Associations Between Life Science Entities," which is incorporated by reference herein in its entirety.

At a process 803, a row score is determined based on the score vector. The row score is an aggregate metric based on the one or more confidence scores that make up the score vector. For example, the row score can be computed as the sum of square roots of the score vector.

At a process 804, the header row is selected based on the row score. For example, the row score of the header row can be compared to row scores of other candidate rows in the data table. Candidate rows may include other rows having a row score greater than a predetermined threshold (e.g., zero). Rows that include certain types of content objects may be excluded from the set of candidate rows. For example, rows that include graphical sequence objects (e.g., phase bars) may be ineligible to be selected as the header row. Rows may also be excluded as eligible header rows based on whether the row includes certain content objects, which can be defined by a SME using a list of excluded content objects ineligible to populate a header row. The header row can then be selected in response to having the highest row score among the candidate rows.

FIGS. 9A-9G are simplified diagrams of pharmaceutical product information tables 900a-g according to some embodiments. In some embodiments consistent with FIGS. 1-8, pharmaceutical product information tables 900a-g may correspond to data tables 131-139. As depicted in FIGS. 9A-9G, the visual and substantive differences shown between pharmaceutical product information tables 900a-g reflect real-world differences in how pharmaceutical product information can be delivered. Despite this wide variability in how the information is delivered, system 100 and methods 200-800 can be configured to automatically parse and interpret pharmaceutical product information tables 900a-g and populate a structured database, such as database 180, based on the information within the tables. In some embodiments, the information retrieved from the pharmaceutical production information tables 900a-g may include columns or rows for a destination website or URL, the drug or development program name, the target population or ailment of a trial, the mechanism of action for the tested drug, the phase information values of the trial such as phase number, dates, or sequence, as well as other information that may be interpreted from the pharmaceutical product information tables 900a-g.

Each of pharmaceutical product information tables 900a-g are arranged in rows and columns. Table 900g includes graphical row markers 912 to demarcate adjacent rows, table 900c includes graphical column markers 914 to demarcate adjacent columns, and tables 900b, 900c, 900e, and 900f include both graphical row markers 912 and graphical column markers 914. As depicted, the graphical markers can include solid lines that are lighter (e.g., table 900c) or darker (e.g., table 900e) than the background color, abrupt changes in the background color (e.g., table 900d), or the like. Table 900a does not include graphical markers, and other tables use graphical markers inconsistently, demarcating some rows or columns but not others. For example, table 900c includes graphical column markers 914 for each row except for the top row. In some embodiments, each individual row in the data table may be associated with a single drug or candidate topic, including the information types described above. Any additional information associated with the drug or candidate topic may be presented in the table using separate columns in the form of name-value pairs. For example, the name-value pair could derive the name from the header text associated with the identified column and the value could be the context within the individual cells. In some embodiments, for example, if a column in the data table is identified as non-standard (i.e. not within the heading dictionary), the contents of that data table column may be stored in a database table column titled "Others" containing list of name-value pairs. The format of that data may include [{'name':'column name 1', value':'column value 1'}, {'name':'column name 2', 'value':'column value 2'}]. In some embodiments, the database table may contain names which are not present in the created dictionary of entity types. Additional information may also be stored in the form of metadata associated with the data structuring including the currency of the data table or technology used to implement the study or trial, among other data types.

In addition, each of pharmaceutical product information tables 900a-g includes a plurality of progress bars 920 indicating the stage of development of a given drug candidate (e.g., discovery, preclinical, Phase I, Phase II, Phase III, etc.). Progress bars 920 are depicted in a variety of styles and include arrows or bars of varying shapes and colors. In general, progress bars 920 can span multiple cells.

In some embodiments, the database table may be created by defining a new categorical entity, meant to define a column or row of a data table that is not previously created as part of the manual heading dictionary. In this way, the system may create a database structured data entry template based on recognition of categorical entities within newly-identified image representations.

FIGS. 10A-10D are simplified diagrams of pharmaceutical product information tables 1000a-d in which logical groupings of text 1010 have been automatically identified according to some embodiments. According to some embodiments consistent with FIGS. 1-8, the locations of logical groupings 1010 may be identified using a neural network model, e.g., as described above with reference to processes 302-304. In particular, the annotations in tables 1000a-f correspond to outputs generated at process 304 of method 300. The depictions of pharmaceutical product information tables 1000a-d were determined using an experimental system with features that are consistent with system 100, the experimental system being configured to perform a method consistent with method 300. The neural network model used to identify the locations of the content objects corresponds to the YOLOv3 neural network model. Each of logical groupings 1010 is shown with a bounding rectangle (dashed) around the text.

FIGS. 11A-11F are simplified diagrams of pharmaceutical product information tables 1100a-f in which cells have been identified as belonging to particular rows and columns according to some embodiments. The depictions of pharmaceutical product information tables 1100a-f were generated by the experimental system described above with reference to FIG. 10. In particular, the annotations in tables 1100a-f correspond to outputs generated at process 305 of method 300. The locations of cells are identified by boxes 1110 (dashed), and the locations of progress bars are identified by boxes 1120 (dashed). According to some embodiments consistent with FIGS. 1-8, the boxes 1110 and 1120 may be identified using one or more of process 305, method 500, and/or method 600. Arrows 1130 (dashed) connect cells identified as belonging to the header row. Arrows 1140 (solid) connect cells identified as belonging to a given column. Arrows 1150 (dot-dashed) connect cells and phase bars identified as belonging to a given row. According to some embodiments consistent with FIGS. 1-8, the arrows 1140-1150 may be identified using process 306, method 700 and/or method 800. In table 1100b, the first column does not include a header content object, so a default header cell 1160 is assigned to the first column.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A method comprising:
    accessing, by one or more computer processors, an image representation of a data table, the data table comprising one or more cells arranged in one or more rows and one or more columns, the one or more cells comprising a first cell that belongs to at least one first row and at least one first column, the first cell being populated with a first content object, the first content object comprising a progress bar, wherein a length of the progress bar is associated with sequence information;
    providing, by the one or more computer processors, the image representation as an input to a neural network model that is trained to identify locations of content objects in image representations;
    executing, by the one or more computer processors, the neural network model to identify a location of the first content object in the image representation;
    identifying, by the one or more computer processors, a location of the first cell based on the location of the first content object;
    determining, by the one or more computer processors, that the first cell belongs to the at least one first row and the first column based on one or more of the location of the first cell and the first content object in relation to a plurality of content objects associated with the one or more rows and the one or more columns;
    associating, by the one or more computer processors, the first content object with one or more categorical identifiers;
    determining, by the one or more computer processors, the length of the progress bar based on the image representation;
    extracting, by the one or more computer processors, the sequence information from the progress bar based on the determined length of the progress bar; and
    populating, by the one or more computer processors, a structured database with the sequence information and the one or more categorical identifiers based on determining that the first cell belongs to the at least one first row and the at least one first column, the structured database including at least one data table row associated with the at least one first row and at least one data table column associated with the at least one first column.

2. The method of claim 1, further comprising:
    creating one of at least one second column and at least one second row within the structured database.

3. The method of claim 1, wherein accessing the image representation comprises:
    receiving, by the one or more computer processors, a digital document via a computer network, the digital document comprising the data table;
    rendering, by the one or more computer processors, the digital document as a digital image; and
    locating, by the one or more computer processors, the image representation of the data table within the rendered digital image.

4. The method of claim 1, wherein the location of the first content object comprises
    a first region that corresponds to least a portion of the first content object, and
    wherein identifying the location of the first cell based on the location of the first content object comprises:
        expanding the first region in at least one direction,
        determining that the expanded first region includes a graphical marker that marks one or more of a row boundary and a column boundary, and
        in response to determining that the expanded first region includes the graphical marker, identifying the expanded first region as corresponding to the location of the first cell.

5. The method of claim 3, wherein determining that the expanded first region includes the graphical marker comprises:
    identifying a plurality of pixel positions that correspond to an edge of the expanded first region,
    for each pixel position in the plurality of pixel positions, determining whether the pixel position is associated with a change in one or more of color and intensity along the at least one direction of expansion that exceeds a first predetermined threshold,
    determining that a count of the plurality of the pixel positions that are associated with the change in color or intensity exceeds a second predetermined threshold, and
    in response to determining that the number of the plurality of pixel positions exceeds the second predetermined threshold, determining that the expanded first region includes the graphical marker.

6. The method of claim 1, wherein the location of the first cell comprises a row span along a row axis and a column span along a column axis, and
    wherein determining that the first cell belongs to the at least one first row and the at least one first column based on the location of the first cell comprises:

sorting at least a subset of the one or more cells in the data table based on a plurality of locations of the plurality of cells, starting with a selected cell among the subset of the one or more cells, recursively performing operations to identify one or more second cells that belong to the first row the operations comprising:

determining at least one other cell with row spans that overlap a row span of the selected cell, identifying a nearest cell to the selected cell among the at least one other cell, identifying the nearest cell as belonging to the at least one first row, selecting the nearest cell as the next selected cell, identifying a header row among the one or more rows of the data table based on one or more header content objects that populate one or more header cells of the header row, determining that the column span of the first cell overlaps with a column span of a first header cell among the one or more header cells, and identifying the first cell as belonging to the first column, the first column being associated with the first header cell.

7. The method of claim 6, wherein identifying the header row among the one or more rows of the data table comprises:

generating one or more text representations corresponding to the one or more header content objects;

matching each of the one or more text representations to a header dictionary, yielding a score vector comprising one or more confidence scores that correspond to the one or more text representations, each confidence score being based on a strength of the matching;

determining a row score based on the score vector; and selecting the header row based on the row score.

8. The method of claim 7, wherein determining the row score based on the score vector comprises calculating an aggregate metric based on one or more of the score vector and the one or more confidence scores.

9. The method of claim 7, wherein selecting the header row comprises:

comparing the row score to at least one secondary row score associated with the one or more rows of the data table, and selecting the header row based on a relative value of the row score and the at least one secondary row score.

10. The method of claim 6, further comprising:

retrieving, by the one or more computer processors, a list of excluded header content objects not eligible to be part of the header row;

determining, by the one or more computer processors, whether the one or more header content objects that populate the one or more header cells of the header row are matched with the excluded header content objects, and;

if the one or more header content objects are on the list of excluded header content objects, identifying, by the one or more computer processors, a replacement header row among the one or more rows of the data table based on the one or more header content objects that populate the one or more header cells of the header row.

11. The method of claim 1, wherein the sequence information corresponds to at least one of a development stage of a project or a clinical trial phase of a pharmaceutical product.

12. The method of claim 1, wherein the length of the progress bar is determined by distinguishing between filled and unfilled portions of the progress bar and identifying the length of the filled portion.

13. The method of claim 1, wherein determining the length of the progress bar comprises determining at least one of a number of rows or a number of columns spanned by the progress bar.

14. The method of claim 1, wherein determining the length of the progress bar comprises determining a percentage of overlap between the progress bar and at least one of a row or a column of the data table.

15. The method of claim 1, further comprising aligning, by the one or more computer processors, the length of the progress bar to at least one of the one or more columns or the one or more rows prior to extracting the sequence information.

16. A computing system for populating structured data sets comprising:

a memory capable of storing a model-based provisioned data template that includes a data template sequence; and a processor in communication with the memory, configured to read the model-based provisioned data template stored in the memory and cause the processor to:

access an image representation of a data table, the data table comprising one or more cells arranged in one or more rows and one or more columns, the one or more cells comprising a first cell that belongs to at least one first row and at least one first column, the first cell being populated with a first content object, the first content object comprising a progress bar, wherein a length of the progress bar is associated with sequence information;

provide the image representation as an input to a neural network model that is trained to identify locations of content objects in image representations;

execute the neural network model to identify a location of the first content object in the image representation, identify a location of the first cell based on the location of the first content object;

determine that the first cell belongs to the at least one first row and the first column based on one or more of the location of the first cell and the first content object in relation to a plurality of content objects associated with the one or more rows and the one or more columns, associating the first content object with one or more categorical identifiers;

determining the length of the progress bar based on the image representation;

determining the sequence information based on the determined length of the progress bar; and populate a structured database with the sequence information and the one or more categorical identifiers based on determining that the first cell belongs to the at least one first row and the at least one first column, the structured database including at least one data table row associated with the at least one first row and at least one data table column associated with the at least one first column.

17. The computing system of claim 16, wherein the processor is further configured to:

create one of at least one second column and at least one second row within the structured database.

18. The computing system of claim 16, wherein accessing the image representation comprises:

receiving, by the one or more computer processors, a digital document via a computer network, the digital document comprising the data table;

rendering, by the one or more computer processors, the digital document as a digital image; and locating, by the one or more computer processors, the image representation of the data table within the rendered digital image.

19. The computing system of claim 16, wherein the location of the first content object comprises a first region that corresponds to least a portion of the first content object, and wherein identifying the location of the first cell based on the location of the first content object comprises:
expanding the first region in at least one direction,
determining that the expanded first region includes a graphical marker that marks one of a row boundary and a column boundary, and,
in response to determining that the expanded first region includes the graphical marker, identifying the expanded first region as corresponding to the location of the first cell.

20. The computing system of claim 19, wherein determining that the expanded first region includes the graphical marker comprises:
identifying a plurality of pixel positions that correspond to an edge of the expanded first region,
for each pixel position in the plurality of pixel positions, determining whether the pixel position is associated with a change in one or more of color and intensity along the at least one direction of expansion that exceeds a first predetermined threshold,
determining that a count of the plurality of the pixel positions that are associated with the change in color or intensity exceeds a second predetermined threshold, and
in response to determining that the number of the plurality of pixel positions exceeds the second predetermined threshold, determining that the expanded first region includes the graphical marker.

21. The computing system of claim 16, wherein the location of the first cell comprises a row span along a row axis and a column span along a column axis, and wherein determining that the first cell belongs to the at least one first row and the at least one first column based on the location of the first cell comprises:
sorting at least a subset of the one or more cells in the data table based on a plurality of locations of the plurality of cells,
starting with a selected cell among the subset of the one or more cells, recursively performing operations to identify one or more second cells that belong to the first row, the one or more second cells including the first cell, the operations comprising:
determining at least one other cell with row spans that overlap a row span of the selected cell,
identifying a nearest cell to the first cell among the set of cells,
identifying the nearest cell as belonging to the at least one first row,
selecting the nearest cell as the next selected cell,
identifying a header row among the one or more rows of the data table based on one or more header content objects that populate one or more header cells of the header row,
determining that the column span of the first cell overlaps with a column span of a first header cell among the one or more header cells, and
identifying the first cell as belonging to the first column, the first column being associated with the first header cell.

22. The computing system of claim 21, wherein identifying the header row among the one or more rows of the data table comprises:
generating one or more text representations corresponding to the one or more header content objects,
matching each of the one or more text representations to a header dictionary, yielding a score vector comprising one or more confidence scores that correspond to the one or more text representations, each confidence score being based on a strength of the matching,
determining a row score based on the score vector, and
selecting the header row based on the row score.

23. The computing system of claim 22, wherein determining the row score based on the score vector comprises calculating an aggregate metric based on one or more of the score vector and the one or more confidence scores.

24. The computing system of claim 22, wherein selecting the header row comprises:
comparing the row score to at least one secondary row score associated with the one or more rows of the data table, and,
selecting the header row based on a relative value of the row score and the at least one secondary row score.

25. The computing system of claim 21, further comprising:
retrieving, by the one or more computer processors, a list of excluded header content objects not eligible to be part of the header row;
determining, by the one or more computer processors, whether the one or more header content objects that populate one or more header cells of the header row are matched with the excluded header content objects; and,
if the one or more header content objects are on the list of excluded header content objects, identifying, by the one or more computer processors, a replacement header row among the one or more rows of the data table based on one or more header content objects that populate one or more header cells of the header row.

* * * * *